United States Patent
Imayoshi

(10) Patent No.: US 11,050,893 B2
(45) Date of Patent: Jun. 29, 2021

(54) IMAGE PROCESSING APPARATUS, IMAGE FORMING APPARATUS, IMAGE PROCESSING METHOD, AND IMAGE PROCESSING PROGRAM

(71) Applicant: SHARP KABUSHIKI KAISHA, Sakai (JP)

(72) Inventor: Kenichiroh Imayoshi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/789,951

(22) Filed: Feb. 13, 2020

(65) Prior Publication Data
US 2020/0274980 A1 Aug. 27, 2020

(30) Foreign Application Priority Data
Feb. 25, 2019 (JP) .............................. JP2019-031979

(51) Int. Cl.
*H04N 1/08* (2006.01)
*H04N 1/00* (2006.01)

(52) U.S. Cl.
CPC ..... *H04N 1/00413* (2013.01); *H04N 1/00411* (2013.01)

(58) Field of Classification Search
CPC ....................... H04N 1/00413; H04N 1/00411
See application file for complete search history.

(56) References Cited

U.S. PATENT DOCUMENTS

| | | | | |
|---|---|---|---|---|
| 2004/0187019 | A1* | 9/2004 | Nanki | G06F 12/1433 726/27 |
| 2004/0263664 | A1* | 12/2004 | Aratani | H04N 1/00291 348/333.12 |
| 2009/0323136 | A1* | 12/2009 | Fujiwara | G03G 15/5025 358/474 |
| 2017/0070624 | A1* | 3/2017 | Hanada | H04N 1/00506 |

FOREIGN PATENT DOCUMENTS

JP 2008-077210 A 4/2008

* cited by examiner

*Primary Examiner* — Ibrahim Siddo
(74) *Attorney, Agent, or Firm* — ScienBiziP, P.C.

(57) ABSTRACT

An image processing apparatus for displaying, on a display, a plurality of thumbnail images respectively corresponding to a plurality of display data includes an input operation receiver that receives an input operation of entering a setting value for at least one of a position and a magnification of a plurality of thumbnails images, and a display switcher that switches a display of a target thumbnail image out of the plurality of display data to a display of a thumbnail image set based on the entered setting value.

16 Claims, 17 Drawing Sheets

DISPLAY THUMBNAIL IMAGE
IF ENLARGEMENT RATIO = 100%

DISPLAY EXAMPLE OF THUMBNAIL IMAGE
IF ENLARGEMENT RATIO = 400%,
REFERENCE POINT = UPPER LEFT

DISPLAY EXAMPLE OF THUMBNAIL IMAGE
IF ENLARGEMENT RATIO = 400%,
REFERENCE POINT = CENTER

DISPLAY EXAMPLE OF THUMBNAIL IMAGE
IF ENLARGEMENT RATIO = 400%,
REFERENCE POINT = LOWER RIGHT

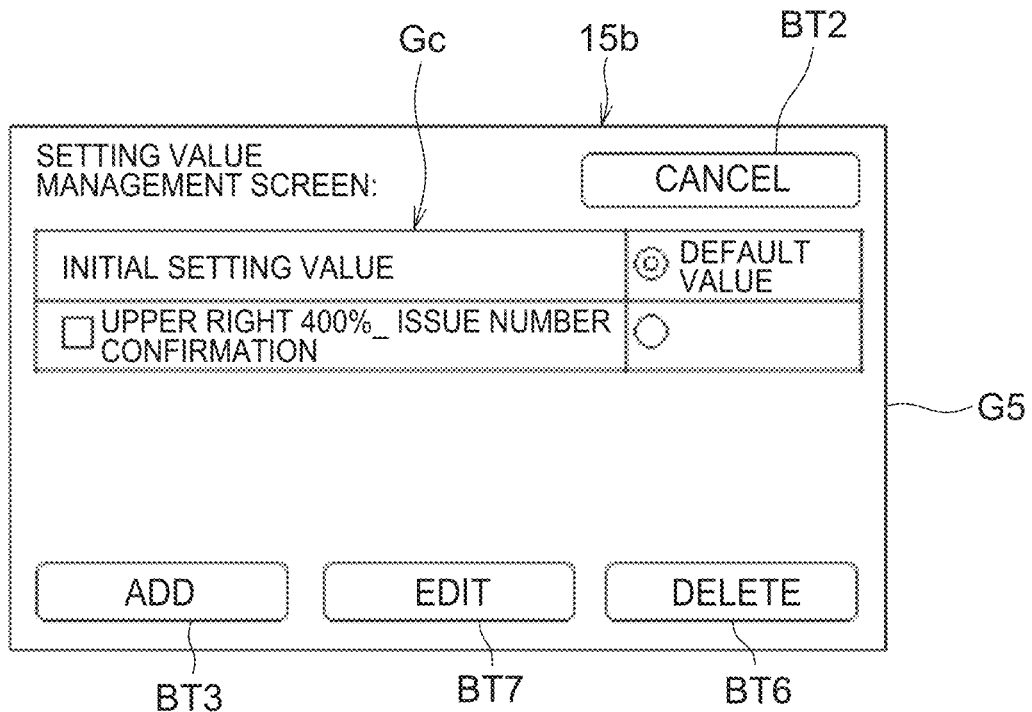
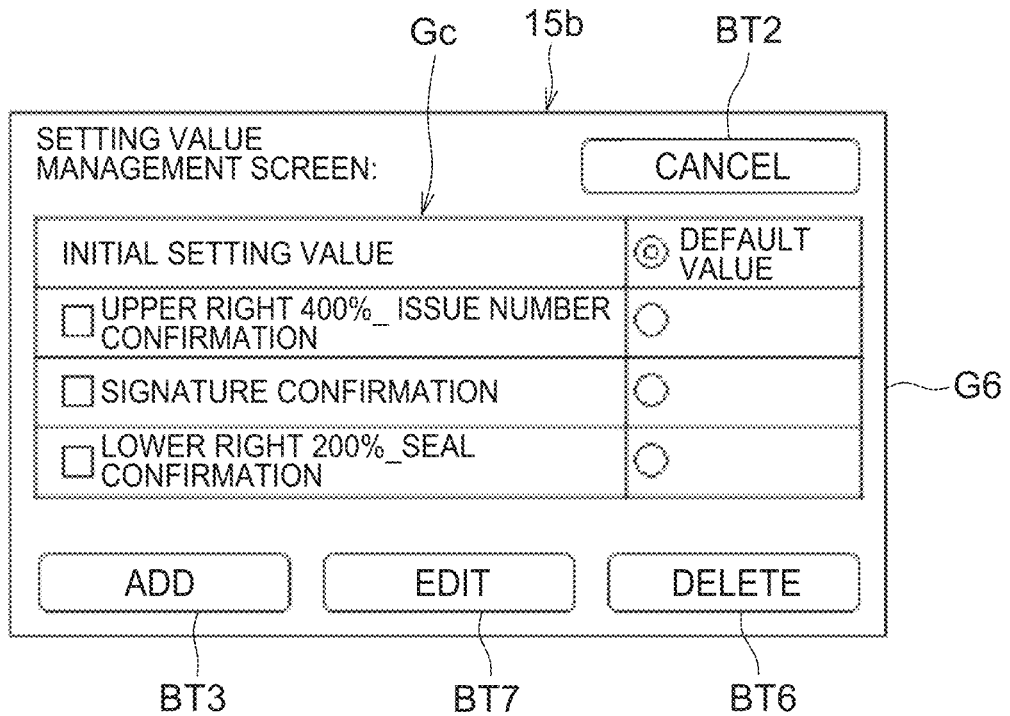

ENLARGEMENT RATIO = 400%,
REFERENCE POINT = UPPER LEFT,
DISPLAY EXAMPLE OF THUMBNAIL IMAGE
IF ROTATED BY 90 DEGREES CLOCKWISE

IMAGE PROCESSING APPARATUS, IMAGE FORMING APPARATUS, IMAGE PROCESSING METHOD, AND IMAGE PROCESSING PROGRAM

BACKGROUND OF THE INVENTION

Field of the Invention

The present invention relates to an image processing apparatus, an image forming apparatus such as a copying machine or a multifunctional apparatus equipped with the image processing apparatus, an image processing method, and an image processing program.

Description of the Background Art

When a plurality of display data are displayed simultaneously on a display (one screen), a plurality of reduced images (so-called thumbnail images) respectively generated from the plurality of display data are often displayed on the display.

As described above, when the plurality of thumbnail images are displayed on the display, if the size of each of the plurality of thumbnail images displayed is increased, the number of thumbnail images displayed simultaneously decreases, and thus, an advantageous characteristic of a list display of the thumbnail images will be deteriorated. Moreover, since the thumbnail images are reduced images from the original display data, the visibility of the thumbnail images is poor. For example, if similar thumbnail images of documents such as quotes are arranged, it is difficult to discriminate a difference between the thumbnail images.

In this regard, Japanese Unexamined Patent Application Publication No. 2008-77210 (hereinafter referred to as Patent Document 1) discloses a technique in which a position of a mouse cursor on thumbnail images on a sub screen of a display is regarded as a scroll position, and the scroll position is enlarged and displayed at a predetermined magnification centering on the scroll position, on a main screen (see paragraph [0026]).

However, according to the configuration disclosed in Patent Document 1, since being enlarged and displayed on the main screen, the thumbnail images have excellent visibility, but it is necessary to use two screens, that is, the sub screen and the main screen on the display. Therefore, the number of thumbnail images displayed simultaneously reduces, and thus, an advantageous characteristic of a list display of the thumbnail images will be deteriorated.

Thus, an object of the present invention is to provide an image processing apparatus for displaying a plurality of thumbnail images on a display, the image processing apparatus capable of improving the visibility of the thumbnail images displayed on the display, and also avoiding deterioration in an advantageous characteristic of a list display of the thumbnail images, an image forming apparatus therefor, an image processing method therefor, and an image processing program therefor.

SUMMARY OF THE INVENTION

To solve the above problems, the present invention provides the following image processing apparatus, image forming apparatus, image processing method, and image processing program.

(1) Image Processing Apparatus

An image processing apparatus according to the present invention for displaying, on a display, a plurality of thumbnail images respectively corresponding to a plurality of display data, the image processing apparatus includes an input operation receiver that receives an input operation of entering a setting value for at least one of a position and a magnification of the plurality of thumbnails images, and a display switcher that switches a display of a target thumbnail image out of the plurality of display data to a display of a thumbnail image set based on the entered setting value.

(2) Image Forming Apparatus

An image forming apparatus according to the present invention includes the image processing apparatus according to the present invention.

(3) Image Processing Method

An image processing method according to the present invention for displaying, on a display, a plurality of thumbnail images respectively corresponding to a plurality of display data, the method includes receiving an input operation of entering a setting value for at least one of a position and a magnification of the plurality of thumbnails images, and switching a display of a target thumbnail image out of the plurality of display data to a display of the thumbnail image set based on the entered setting value.

(4) Image Processing Program

An image processing program according to the present invention for displaying, on a display, a plurality of thumbnail images respectively corresponding to a plurality of display data, the program causes a controller to executes steps including receiving an input operation of entering a setting value for at least one of a position and a magnification of the plurality of thumbnails images, and switching a display of a target thumbnail image out of the plurality of display data to a display of a thumbnail image set based on the entered setting value.

According to the present invention, it is possible to improve the visibility of thumbnail images displayed on a display, and also avoid deterioration in an advantageous characteristic of a list display of the thumbnail images.

BRIEF DESCRIPTION OF THE DRAWINGS

FIG. 12 is a front view illustrating an example of a fifth screen displayed on the display;

FIG. 13 is a front view illustrating an example of a sixth screen displayed on the display;

DESCRIPTION OF THE PREFERRED EMBODIMENTS

Figure 1:
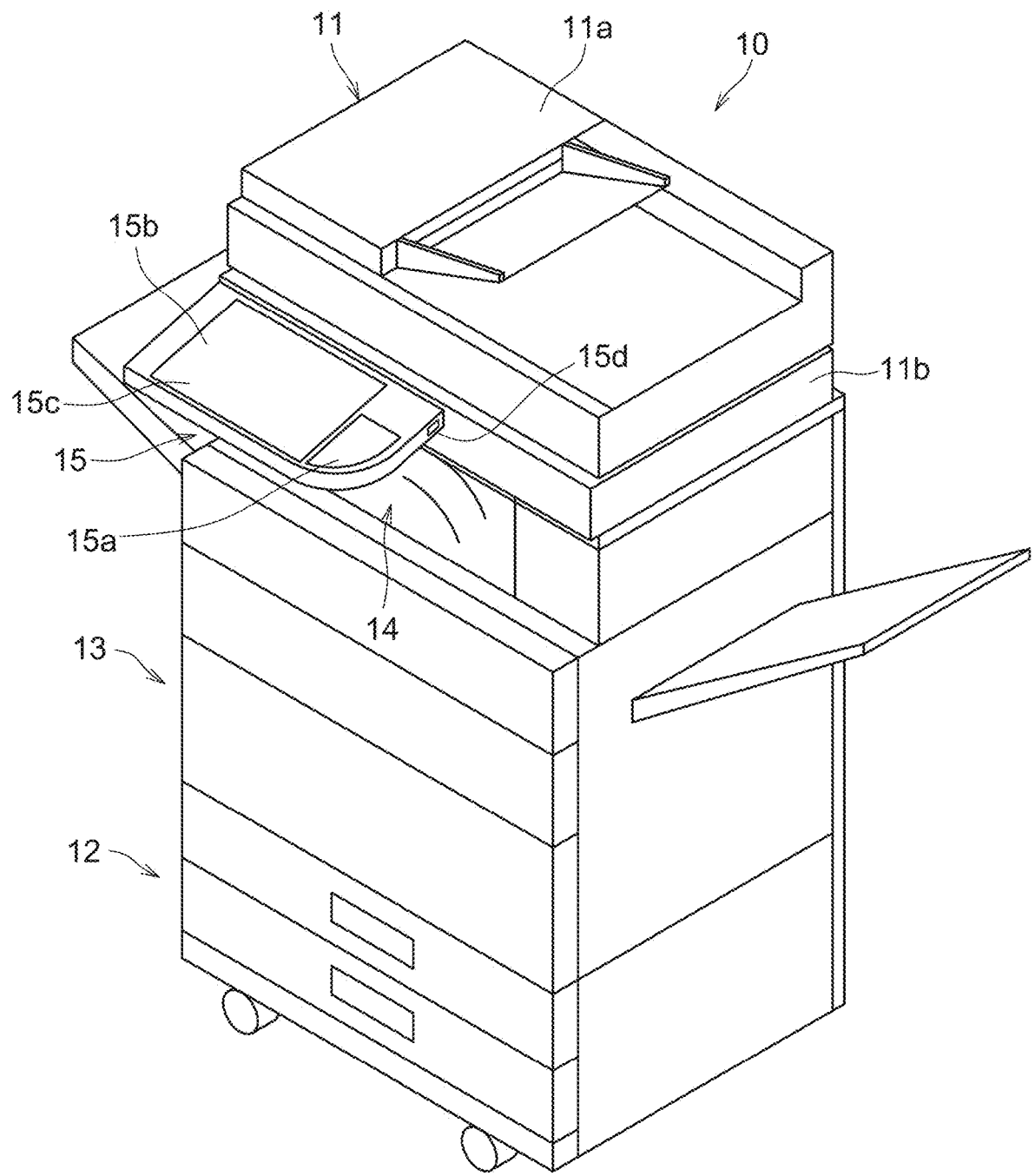
FIG. 1 is a perspective view illustrating an example of an image forming apparatus including an image processing apparatus according to an embodiment of the present invention.

Hereinafter, an embodiment according to the present invention will be described with reference to the drawings. In the following description, same parts are denoted by the same reference numerals. The names and functions of the same parts are also the same. Therefore, detailed description thereof will not be repeated.

Figure 2:
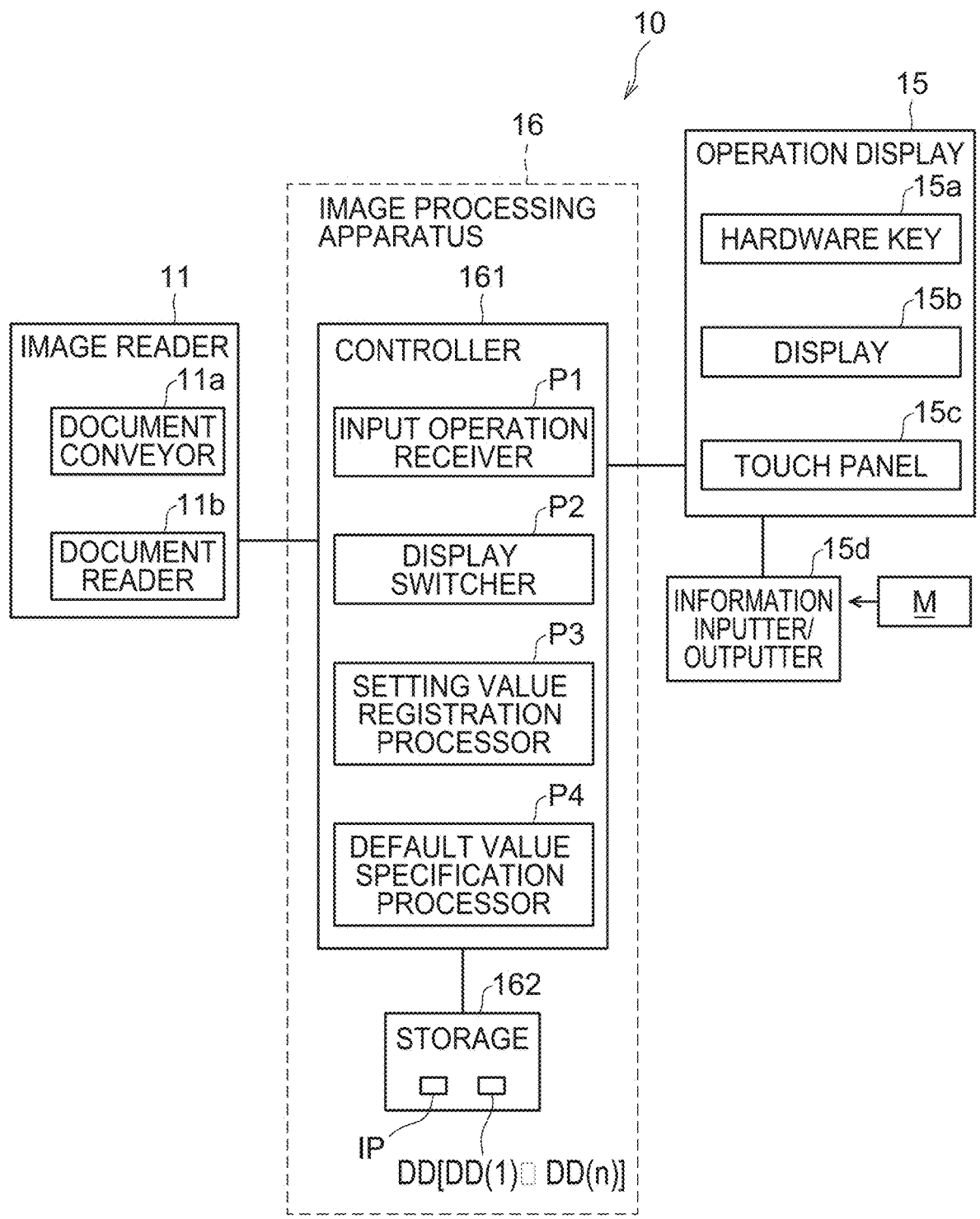
FIG. 2 is a block diagram illustrating an example of a system configuration of the image forming apparatus illustrated in FIG. 1.

FIG. 1 is a perspective view illustrating an example of an image forming apparatus 10 including an image processing apparatus 16 according to an embodiment of the present invention. FIG. 2 is a block diagram illustrating an example of a system configuration of the image forming apparatus 10 illustrated in FIG. 1.

The image forming apparatus 10 has an image forming function (printer function), a scanner function, and a copy function (document copying function). The image forming apparatus 10 includes an image reader 11, a sheet feeder 12, an image former 13, a sheet discharger 14, an operation display 15, and the image processing apparatus 16 (see FIG. 2).

The image reader 11 reads an image of a document, and includes a document conveyor 11a and a document reader 11b. The image reader 11 either reads an image of a document by the document reader 11b while conveying the document with the document conveyor 11a, or scans and reads, by the document reader 11b, a document placed on a platen of the document reader 11b. The sheet feeder 12 conveys a sheet to the image former 13. The image former 13 forms (prints) an image on a sheet sent from the sheet feeder 12 based on image data. The sheet discharger 14 discharges a sheet on which an image is formed by the image former 13.

The operation display 15 receives a user operation, and displays various information on a display screen based on display data DD [DD(1) to DD(n) (n is an integer of 2 or greater)] (see FIG. 2). The operation display 15 includes a hardware key 15a, a display 15b (display panel), a touch panel 15c provided on the display 15b, and an information inputter/outputter 15d. The operation display 15 receives, on the touch panel 15c, a user touch operation on various software keys displayed on the display 15b. The information inputter/outputter 15d is a connection-type interface, and includes a port (USB (registered trademark) port) for reading and writing information recorded in an external storage device such as a USB memory M.

In the present embodiment, the image forming apparatus 10 not only provides general services such as copying (document copying), printing, faxing, and scanning to a user, but also provides other various services to a user. For example, a plurality of display data are entered to the image forming apparatus 10 from the USB memory M via the information inputter/outputter 15d. The image forming apparatus 10 to which the plurality of display data DD are entered displays, on the display 15b, a plurality of reduced images (so-called thumbnail images) respectively generated from the plurality of display data DD. The display of the thumbnail images will be described below in detail.

Hardware Configuration of Image Processing Apparatus

As illustrated in FIG. 2, the image processing apparatus 16 includes a controller 161 and a storage 162. The image reader 11 and the operation display 15 are electrically connected to the controller 161.

Controller

The controller 161 includes a computer such as a Central Processing Unit (CPU). The controller 161 is configured to execute an image processing program IP stored (installed) in advance in the storage 162 to implement various functions necessary for the controller 161. The controller 161 loads the image processing program IP stored in advance in a Read Only Memory (ROM) of the storage 162 onto a Random Access Memory (RAM) of the storage 162 and executes the image processing program IP to perform image processing control including displaying a plurality of thumbnail images respectively corresponding to a plurality of display data.

Further, if a touch operation with a finger of the user is received on the touch panel 15c of the display 15b, the touch panel 15c reads the operation position, and the controller 161 determines that an operation button displayed at the operation position on the display 15b is depressed and performs processing.

Storage

The storage 162, under an instruction of the controller 161, performs write control for writing information and read control for reading information. In this example, the storage 162 is a mass storage device such as a hard disk or a flash memory. The image processing program IP is stored (installed) in advance in the storage 162.

Moreover, the display data DD(1) to DD(n) such as photograph data taken from an external storage medium, file data for word processors, and file data including spreadsheet file data are stored in the storage 162.

Software Configuration of Image Processing Apparatus

The controller 161 functions as a device including an input operation receiver P1, a display switcher P2, a setting value registration processor P3, and a default value specification processor P4. That is, the image processing program IP causes the controller 161 to execute steps including an input operation receiving step corresponding to the input operation receiver P1, a display switching step corresponding to the display switcher P2, a setting value registering step corresponding to the setting value registration processor P3, and a default value specifying step corresponding to the default value specification processor P4.

Figure 3:
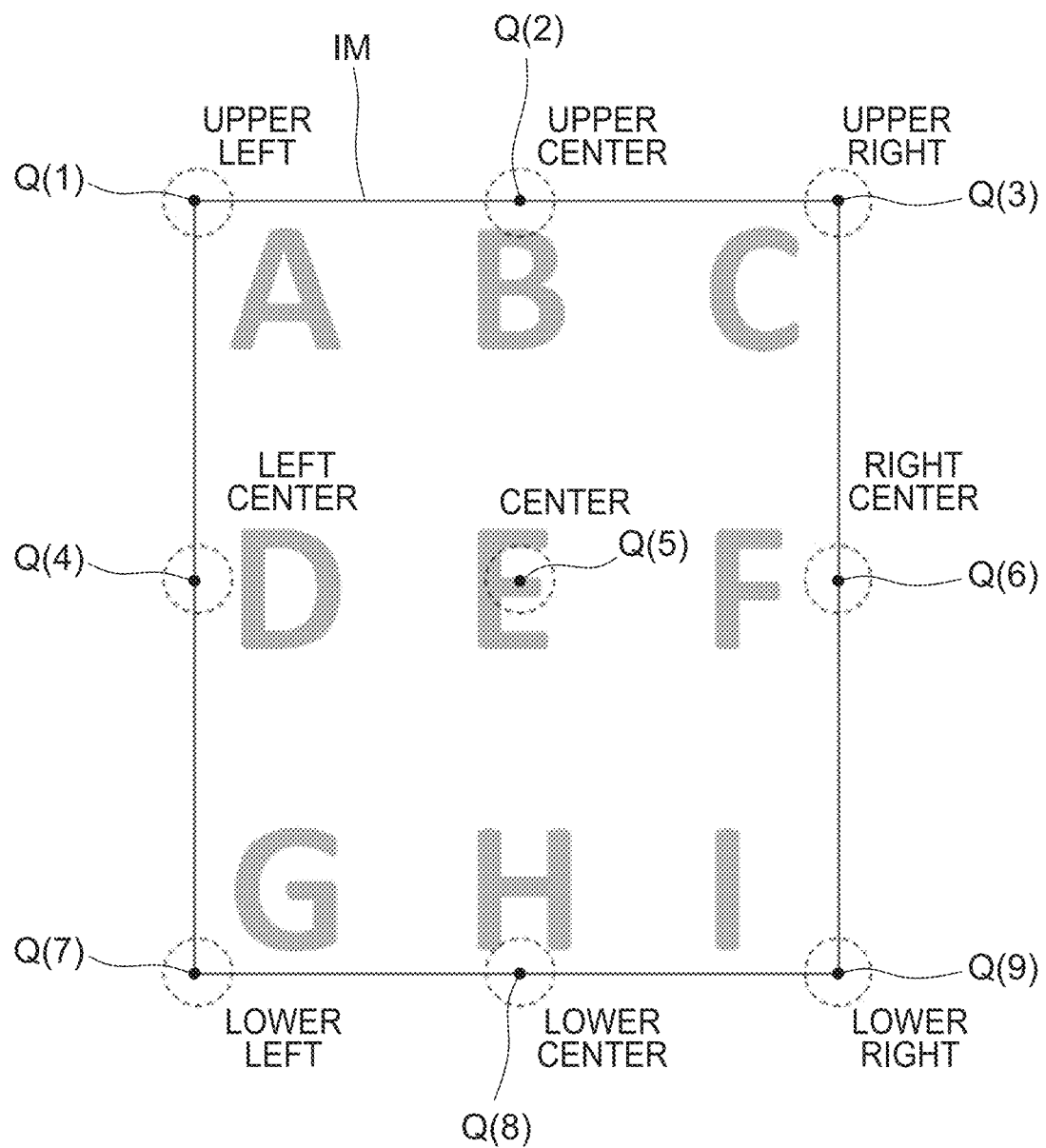
FIG. 3 is a plan view illustrating a reference point in an example of a display image corresponding to display data.
Figure 4:
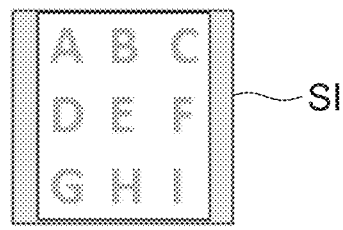
FIG. 4 is a plan view displaying a thumbnail image (magnification 100%) corresponding to the display image illustrated in FIG. 3.
Figure 5:
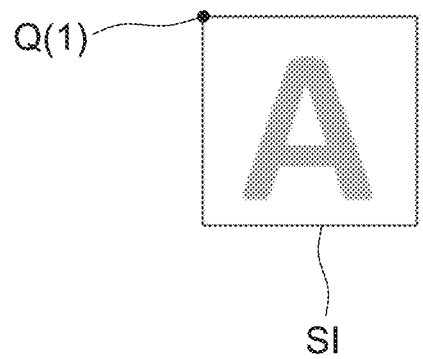
FIG. 5 is a plan view displaying a thumbnail image set at an enlargement ratio (400%) in a state where an upper left reference point is fixed in the display image illustrated in FIG. 3.
Figure 6:
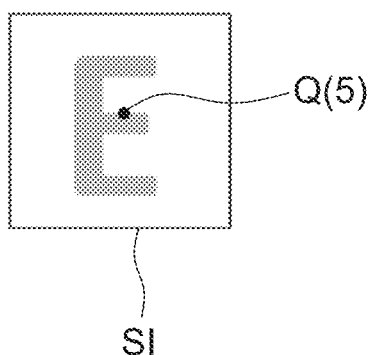
FIG. 6 is a plan view displaying a thumbnail image set at an enlargement ratio (400%) in a state where a center reference point is fixed in the display image illustrated in FIG. 3.
Figure 7:
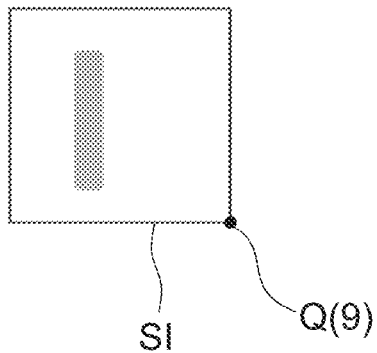
FIG. 7 is a plan view displaying a thumbnail image set at an enlargement ratio (400%) in a state where a lower right reference point is fixed in the display image illustrated in FIG. 3.

FIG. 3 is a plan view illustrating a reference point Q in an example of a display image IM corresponding to the display data DD. In FIG. 3, reference points Q [Q(1) to Q(m) (m is an integer of 2 or greater, m=9 in this example)] respectively represent the upper left, the upper center, the upper right, the left center, the center, the right center, the lower left, the lower center, and the lower right. FIG. 4 is a plan view displaying a thumbnail image SI (at the magnification 100%) corresponding to the display image IM illustrated in FIG. 3. FIG. 5 through FIG. 7 are plan views respectively displaying the thumbnail image SI set at an enlargement ratio ER (400%) in a state where the upper left reference point Q(1), the center reference point Q(5), and the lower right reference point Q(9) are fixed in the display image IM illustrated in FIG. 3.

FIG. 8 through FIG. 30 are front views illustrating examples of a first screen G1 through a twenty third screen G23 displayed on the display 15b.

The image processing apparatus 16 displays, on the display 15b, a plurality of thumbnail images SI [SI(i) to SI(n)] respectively corresponding to the plurality of display data DD(1) to DD(n). The input operation receiver P1 receives an input operation of entering a setting value [reference points Q(1) to Q(9), enlargement ratio ER] for the position and/oar magnification of the plurality of thumbnail images SI(1) to SI(n). The display switcher P2 switches a display of target thumbnail images SI(1) to SI(i) (i is an integer of from 1 to n, i=3 in this example) out of the plurality of display data DD(1) to DD(n) to a display of thumbnail images SI(1) to SI(i) set based on the entered setting value [reference points Q(1) to Q(9), enlargement ratio ER].

Here, examples of the "target thumbnail images" include, but are not limited to, the following.

[1] All thumbnail images SI(1) to SI(n) corresponding to all display data DD(1) to DD(n) saved in all folders.
[2] Thumbnail images SI(1) to SI(i) corresponding to display data DD(1) to DD(i) saved in a specific folder.
[3] Thumbnail images SI(1) to SI(i) corresponding to display data DD(1) to DD(i) having a file name including an entered specific character (for example, characters "written settlement") out of all display data DD(1) to DD(n).
[4] Thumbnail images SI(1) to SI(j) corresponding to display data DD(1) to DD(j) (j is an integer of form 1 to i) having a file name including an entered specific character (for example, characters "written settlement") out of specific display data DD(1) to DD(i).
[5] Thumbnail images SI(1) to SI(i) in a scroll screen when the number of thumbnail images SI(1) to SI(n) to be displayed exceeds the display number k per screen (k is an integer of 2 or greater).

According to the present embodiment, since a display of the target thumbnail image SI(1) to SI(i) out of the plurality of display data DD(i) to DD(n) is switched to a display of thumbnail images SI(i) to SI(i) set based on the setting value [reference points Q(1) to Q(9), enlargement ratio ER] for the position and/or magnification of the target thumbnail images S1 (1) to SI(i), the visibility of the thumbnail images SI(1) to SI(i) to be displayed on the display 15b can be improved. In addition, the display of the target thumbnail images is switched to the display of the thumbnail images SI(1) to SI(i) set based on the entered setting value, and thus, it is possible to deterioration in an advantageous characteristic of a list display of the thumbnail images SI(1) to SI(i) to be displayed on the display 15b.

Thumbnail Image Setting Operation

Next, an example of an operation of setting a thumbnail image will be specifically described with reference to FIG. 8 through FIG. 30.

Figure 8:
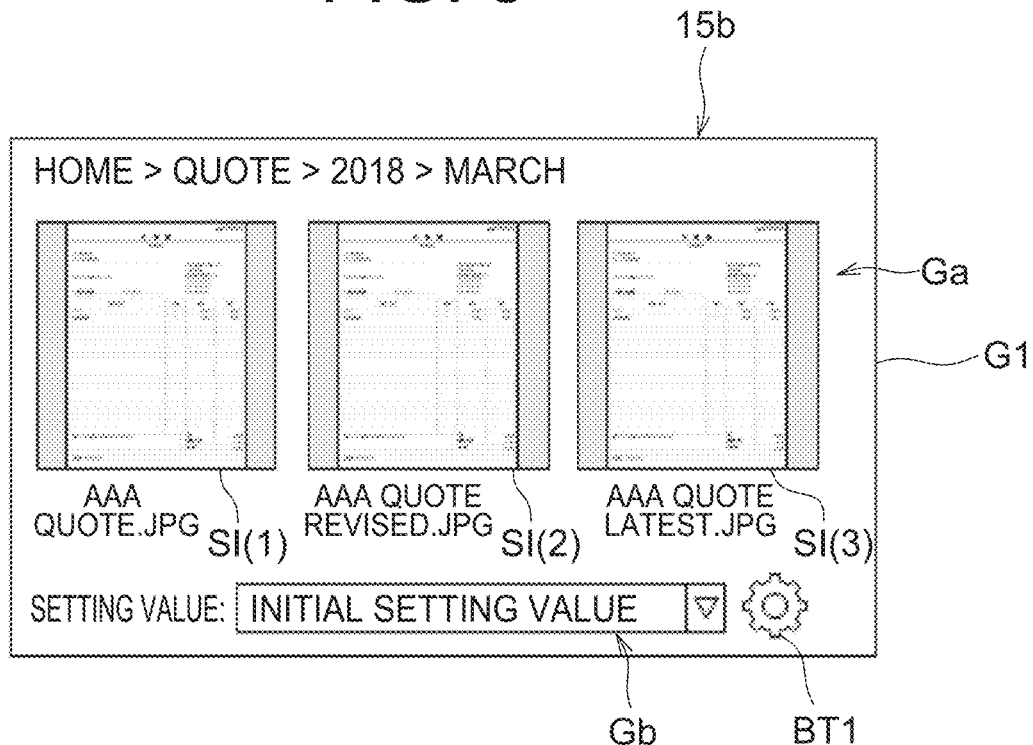
FIG. 8 is a front view illustrating an example of a first screen displayed on the display.

The image forming apparatus 10 to which the plurality of display data DD(1) to DD(n) are entered displays the target thumbnail images SI(i) to SI(3) out of the plurality of display data DD(1) to DD(n) on the first screen G1 (see FIG. 8). It is noted that in this example, the image forming apparatus 10 is in a factory shipment state, and an initial setting value [reference point Q(1) (upper left), enlargement ratio ER=100%] is registered in advance in the storage 162.

First Screen

In the first screen G1 (thumbnail image display screen) illustrated in FIG. 8, the controller 161 displays the thumbnail images SI(1) to SI(3) set based on the initial setting value [reference point Q(1) (upper left), enlargement ratio ER=100%] in a display field Ga, and displays only "Initial setting value" in a pulldown menu Gb of the setting value. If the user touches an "Administrator mark" button BT1 on the first screen G1, the display screen shifts to the second screen G2 (see FIG. 9).

Second Screen

Figure 9:
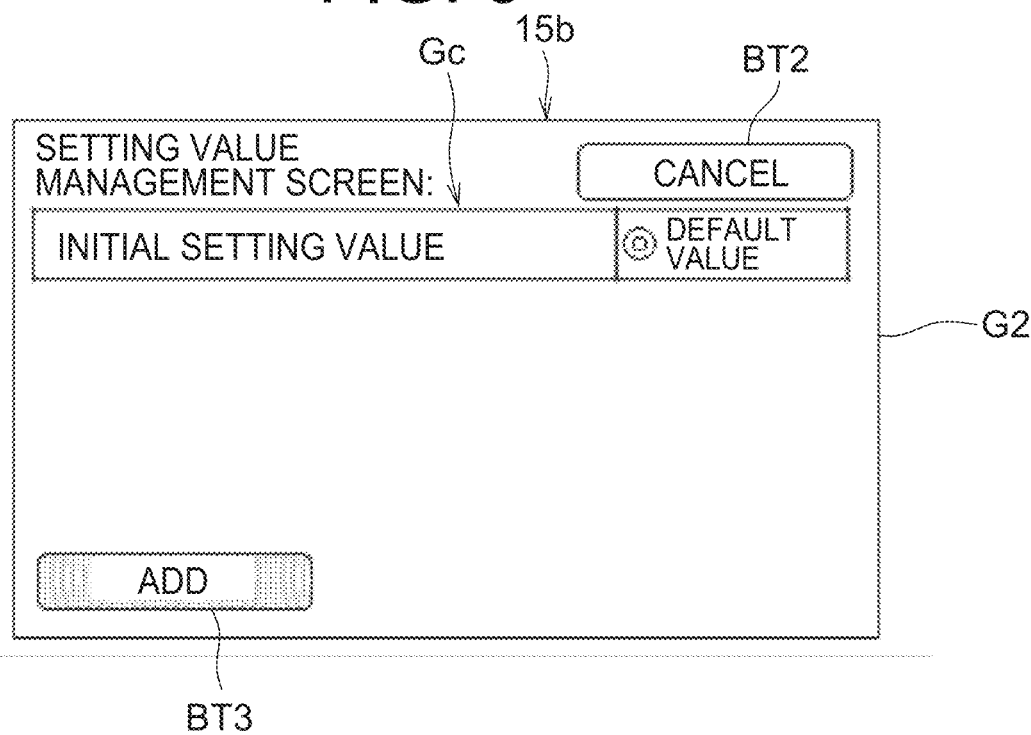
FIG. 9 is a front view illustrating an example of a second screen displayed on the display.

In the second screen G2 (setting value management screen) illustrated in FIG. 9, the controller 161 displays, in a registration display field Gc, a setting value registered in the storage 162. Here, only "Initial setting value" is displayed. If the user touches a "Cancel" button BT2 on the second screen G2, the display screen returns to the first screen G1. On the other hand, if the user touches an "Add" button BT3, the display screen shifts to the third screen G3 (see FIG. 10).

Third Screen

Figure 10:
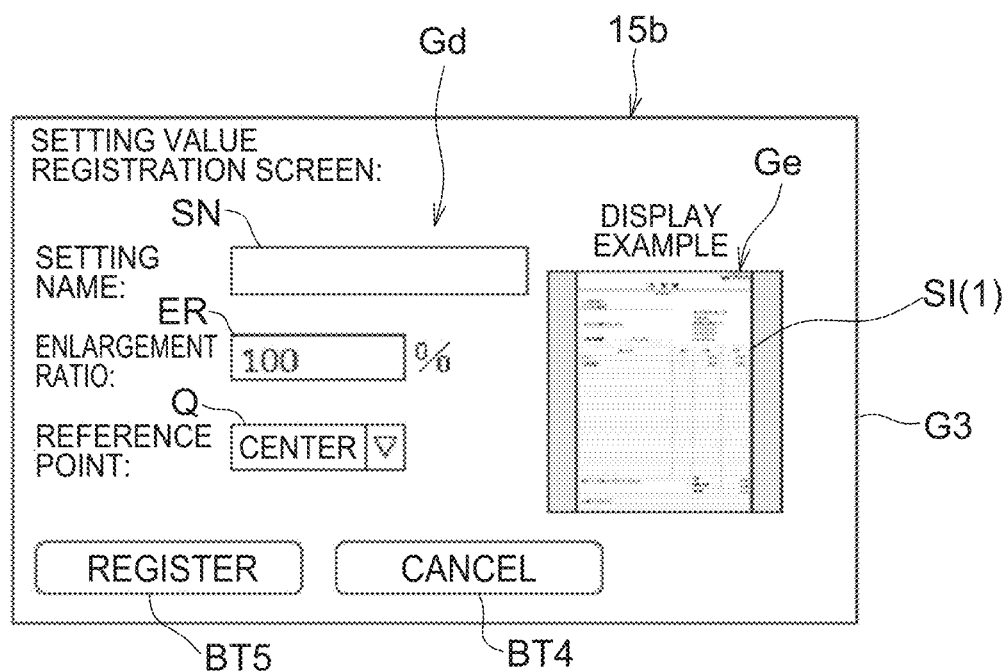
FIG. 10 is a front view illustrating an example of a third screen displayed on the display.

In the third screen G3 (setting value registration screen) illustrated in FIG. 10, the controller 161 displays, in a setting field Gd, the setting value (setting name SN, enlargement ratio ER, and reference point Q) representing the current default value, and displays, in a display example field Ge, a display example of the thumbnail image SI(1) set based on the setting value. Here, the default value is a setting value applicable to all the display data DD(i) to DD(n) stored in the storage 162 unless otherwise specified. The thumbnail image SI of the display data DD displayed in the display example field Ge can be, for example, the thumbnail image SI(1) of the display data DD(1) being first data in a folder.

If the user touches a "Cancel" button BT4 on the third screen G3, the display screen returns to the second screen G2.

Fourth Screen

Figure 11:
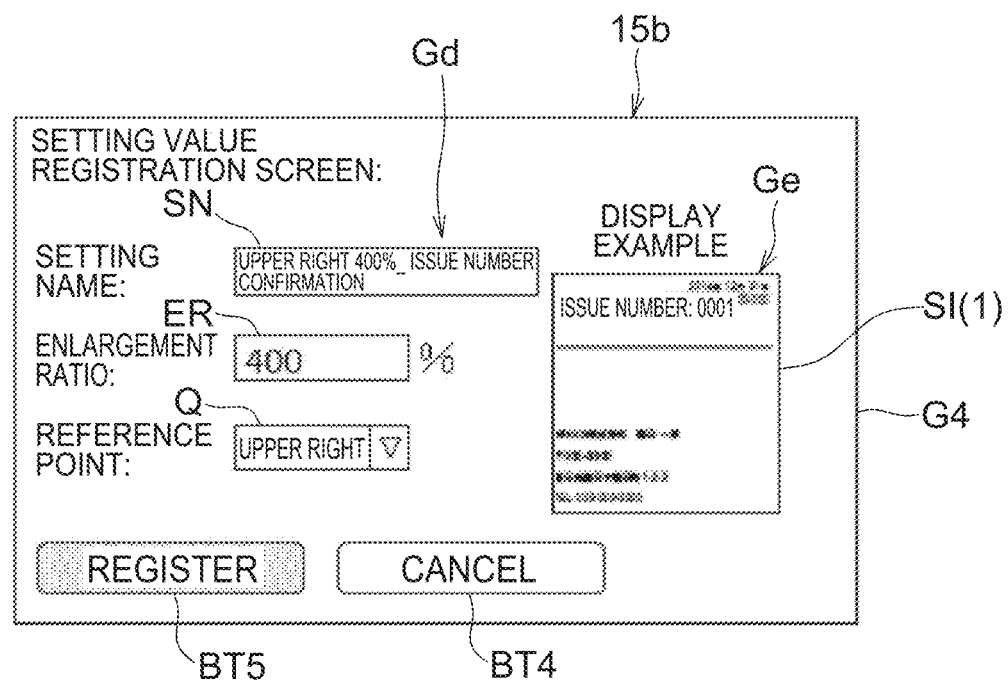
FIG. 11 is a front view illustrating an example of a fourth screen displayed on the display.

On the other hand, as in the fourth screen G4 illustrated in FIG. 11, if the user enters the setting value [setting name SN ("Upper right 400% issue number confirmation"), enlargement ratio ER ("400%"), and reference point Q ("Upper right")], the controller 161 displays the thumbnail image SI( ) at the entered enlargement ratio ER ("400%") in the display example field Ge in a state where the entered reference point Q ("Upper right") is fixed. Next, if the user touches a "Register" button BT5, the controller 161 registers the entered setting value (setting name SN, enlargement ratio ER, and reference point Q) into the storage 162, and the display screen returns to the fifth screen G5 (see FIG. 12).

Fifth Screen

In the fifth screen G5 (setting value management screen) illustrated in FIG. 12, the controller 161 displays the setting value registered in the storage 162 in the registration display field Gc. Here, the "Initial setting value" and the "Upper right 400% issue number confirmation" are displayed in a list.

Sixth Screen

Similarly, if the user registers various setting values into the storage 162, the display screen changes to a setting value management screen such as the sixth screen G6 illustrated in FIG. 13. In the sixth screen G6 (setting value management screen) illustrated in FIG. 13, for example, the "Initial setting value", the "Upper right 400% issue number confirmation", "Signature confirmation", and "Lower right 200%/seal confirmation" are displayed in the registration display field Gc in a list.

Seventh Screen

Figure 14:
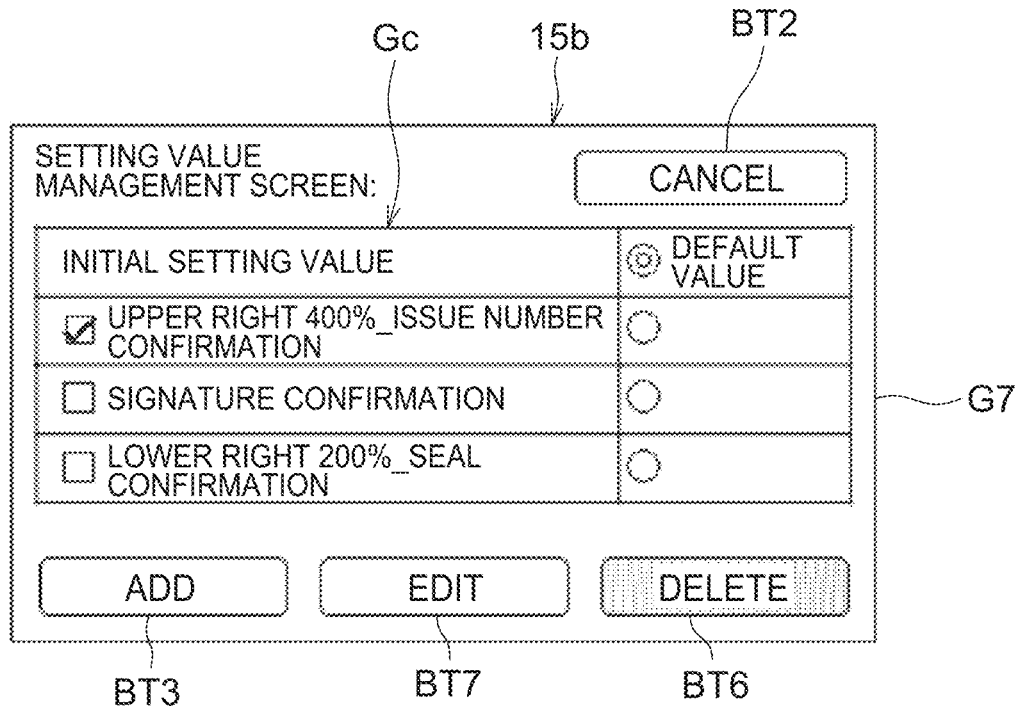
FIG. 14 is a front view illustrating an example of a seventh screen displayed on the display.
Figure 15:
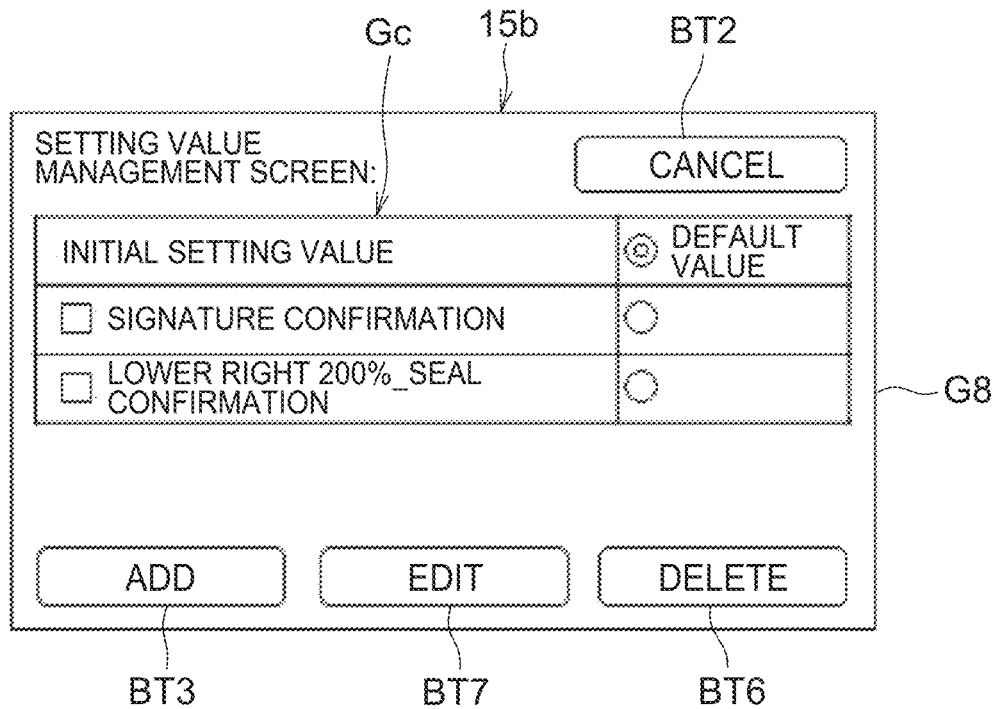
FIG. 15 is a front view illustrating an example of an eighth screen displayed on the display.

Next, when a setting value is to be deleted, for example, when the "Upper right 400% issue number confirmation" is to be deleted, then as in the seventh screen G7 illustrated in FIG. 14, if the user checks an "Upper right 400% issue number confirmation" checkbox and touches a "Delete" button BT6, the controller 161 deletes the setting value (setting name SN, enlargement ratio ER, and reference point Q) of the checked "Upper right 400° % issue number confirmation" from the storage 162, and the display screen shifts to the eighth screen G8 (see FIG. 15).

Eighth Screen

In the eighth screen G8 (setting value management screen) illustrated in FIG. 15, for example, the "Initial setting value", the "Signature confirmation" and the "Lower right 200% seal confirmation" are displayed in the registration display field Gc in a list.

Ninth Screen

Figure 16:
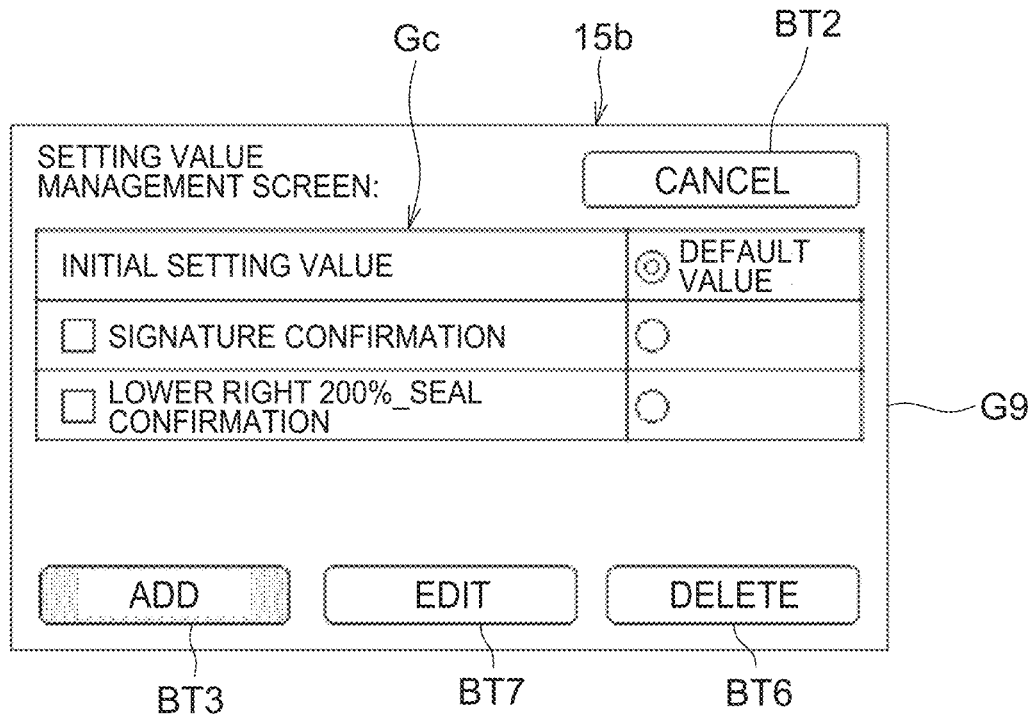
FIG. 16 is a front view illustrating an example of a ninth screen displayed on the display.

Further, as described above, if a new setting value is to be registered, the user touches the "Add" button BT3 as in the ninth screen G9 illustrated in FIG. 16. Then, the display screen shifts to the tenth screen G10 (see FIG. 17).

Tenth Screen

Figure 17:
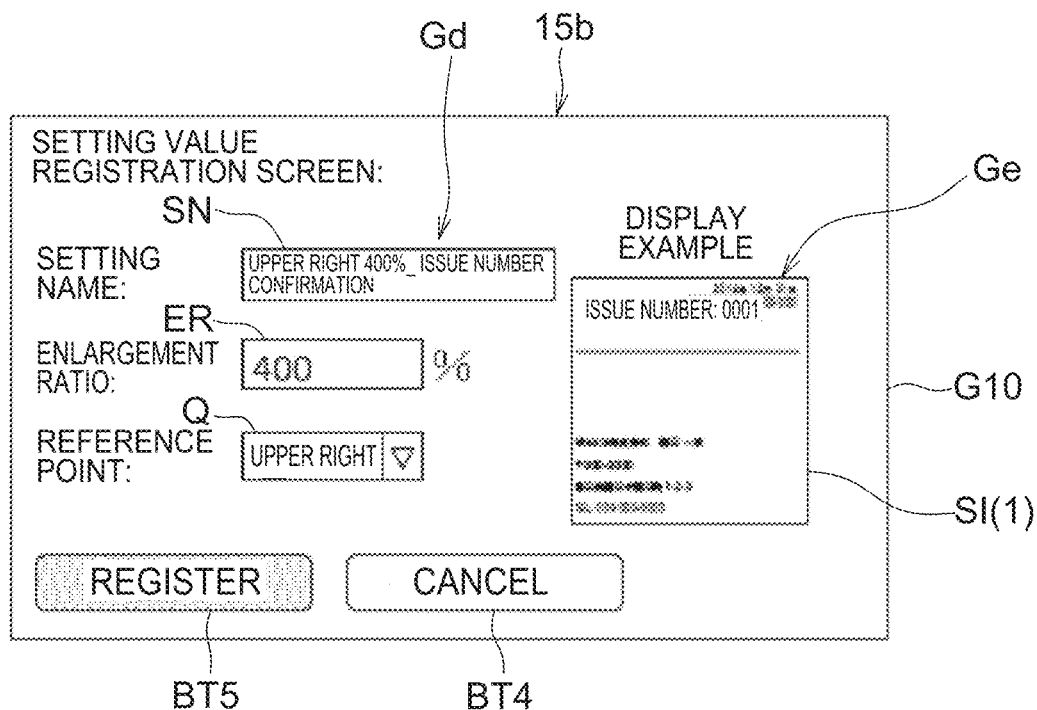
FIG. 17 is a front view illustrating an example of a tenth screen displayed on the display.

In the tenth screen G10 (setting value registration screen) illustrated in FIG. 17, when the setting value [setting name SN ("Upper right 400% issue number confirmation"), enlargement ratio ER ("400%"), and reference point Q("Upper right")] is entered, the controller 161 displays, in the display example field Ge, the thumbnail image SI(i) set based on the entered setting value. If the user touches the "Register" button BT5, the controller 161 registers the entered setting value (setting name SN, enlargement ratio ER, and reference point Q) into the storage 162, and the display screen returns to the eleventh screen G11 (see FIG. 18).

Eleventh Screen

Figure 18:
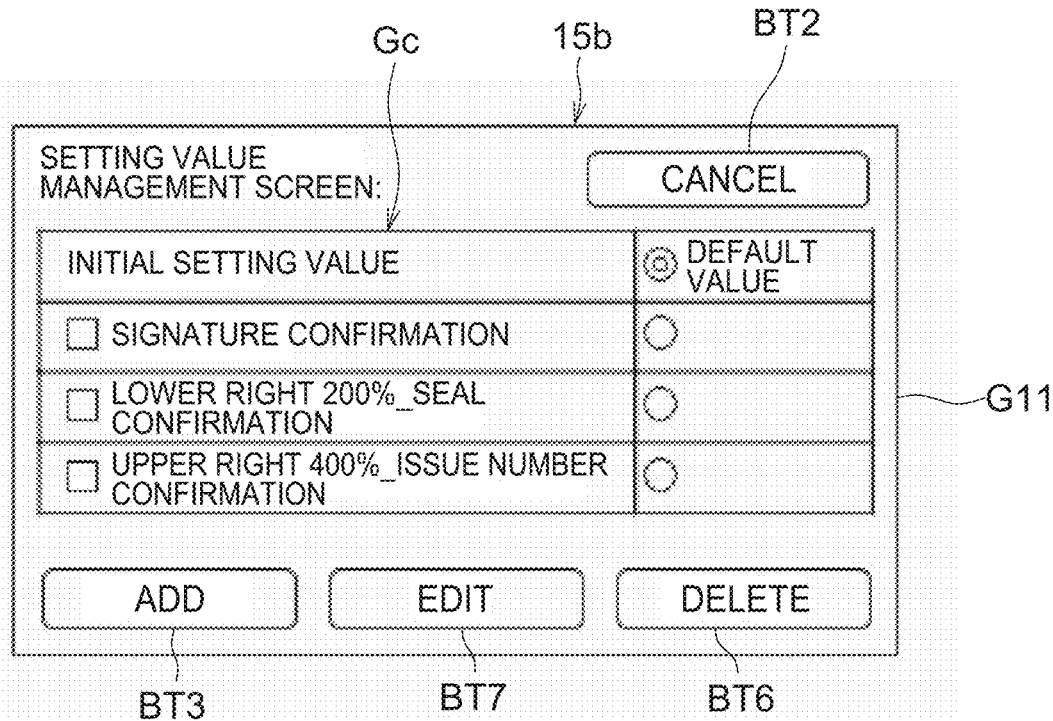
FIG. 18 is a front view illustrating an example of an eleventh screen displayed on the display.

Next, in the eleventh screen G1 (setting value management screen) illustrated in FIG. 18, the "Initial setting value", the "Signature confirmation", the "Lower right 200% seal confirmation" and the "Upper right 400% issue number confirmation" are displayed in a list.

Twelfth Screen

Figure 19:
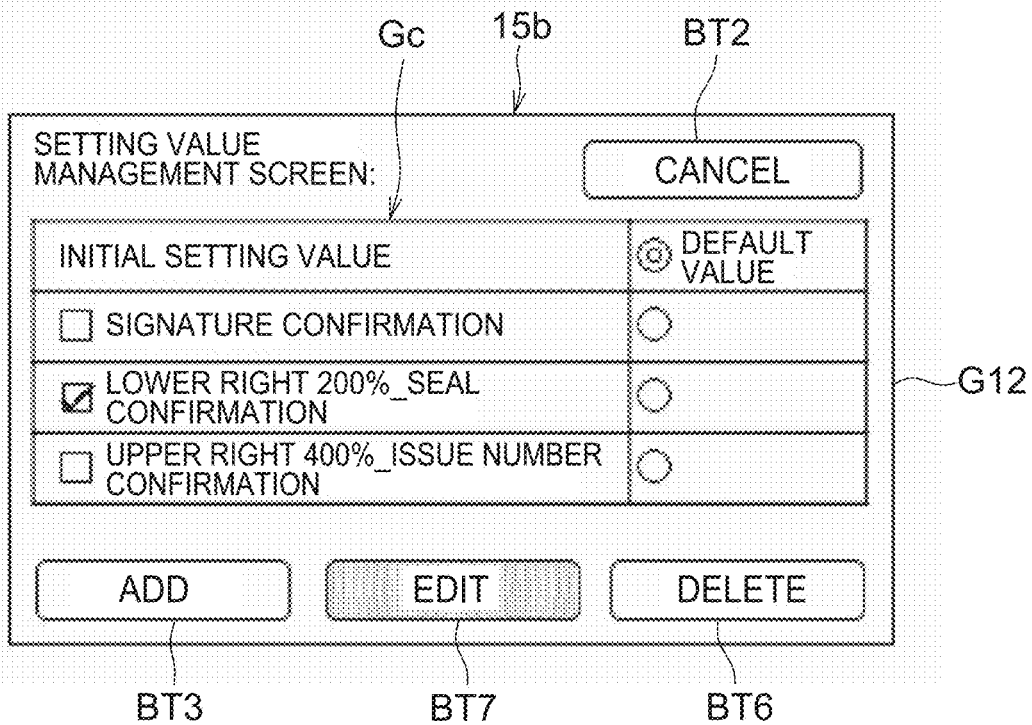
FIG. 19 is a front view illustrating an example of a twelfth screen displayed on the display.
Figure 20:
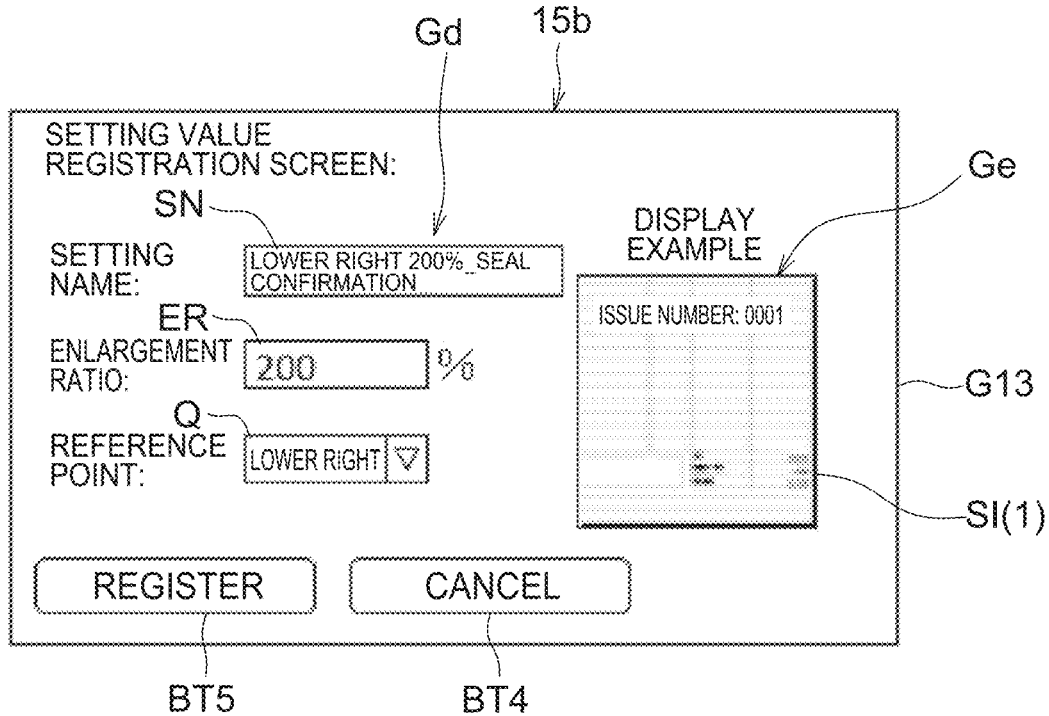
FIG. 20 is a front view illustrating an example of a thirteenth screen displayed on the display.

Next, when the setting value is to be edited, for example, when the "Lower right 200% seal confirmation" is to be edited, then as in the twelfth screen G12 (setting value management screen) illustrated in FIG. 19, if the user checks a "Lower right 200% seal confirmation" checkbox and touches an "Edit" button BT7, the display screen shifts to the thirteenth screen G13 (see FIG. 20).

Thirteenth Screen

In the thirteenth screen G13 (setting value registration screen) illustrated in FIG. 20, if the user touches the "Cancel" button BT4, the display screen returns to the twelfth screen G12.

Fourteenth Screen

Figure 21:
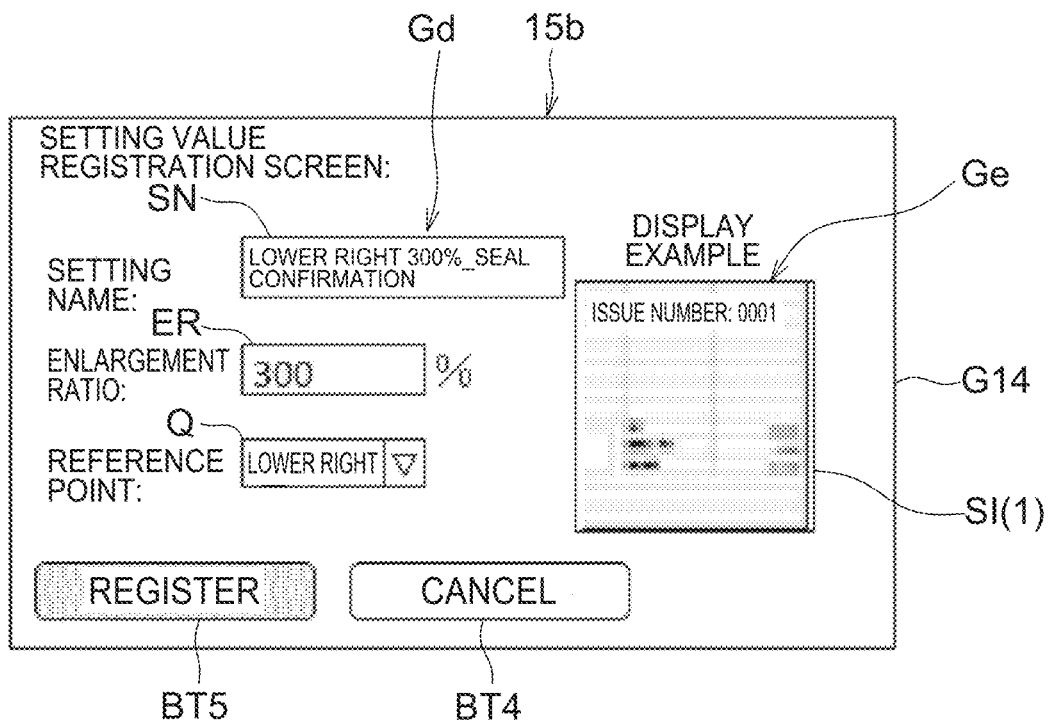
FIG. 21 is a front view illustrating an example of a fourteenth screen displayed on the display.

On the other hand, as in the fourteenth screen G14 illustrated in FIG. 21, if the user enters the setting value [setting name SN ("Lower right 300% seal confirmation"), enlargement ratio ER ("300%"), and reference point Q("lower right")], the controller 161 displays the thumbnail image SI(1) at the entered enlargement ratio ER ("300%") in the display example field Ge in a state where the entered reference point Q ("lower right") is fixed. Next, if the user touches the "Register" button BT5, the display screen shifts to the fifteenth screen G15 (see FIG. 22).

Fifteenth Screen

Figure 22:
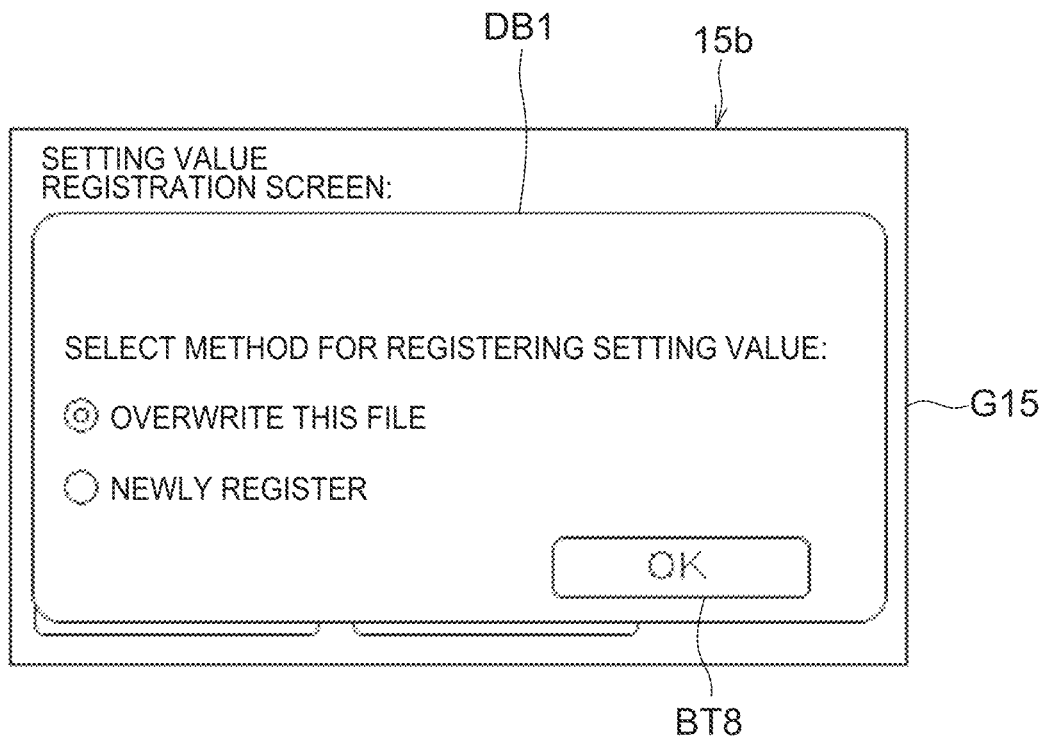
FIG. 22 is a front view illustrating an example of a fifteenth screen displayed on the display.

In the fifteenth screen G15 illustrated in FIG. 22, the controller 161 displays a dialog box DB1 on the display screen. In the dialog box DB1, the controller 161 receives an operation of selecting "Overwrite this file" ("overwrite" a setting value already registered in the storage 162 with a setting value obtained by editing the setting value registered in the storage 162) or "Newly Register" ("Newly Register" the edited setting value into the storage 162). If the user selects the "Overwrite this file" and touches an "OK" button BT8, the controller 161 overwrites and registers the edited setting value (setting name SN, enlargement ratio ER, and reference point Q) into the storage 162. On the other hand, if the user selects "Newly Register" and touches the "OK" button BT8, the controller 161 newly registers the edited setting value (setting name SN, enlargement ratio ER, and reference point Q) into the storage 162. Then, the display screen returns to the sixteenth screen G16 (see FIG. 23).

Sixteenth Screen

Figure 23:
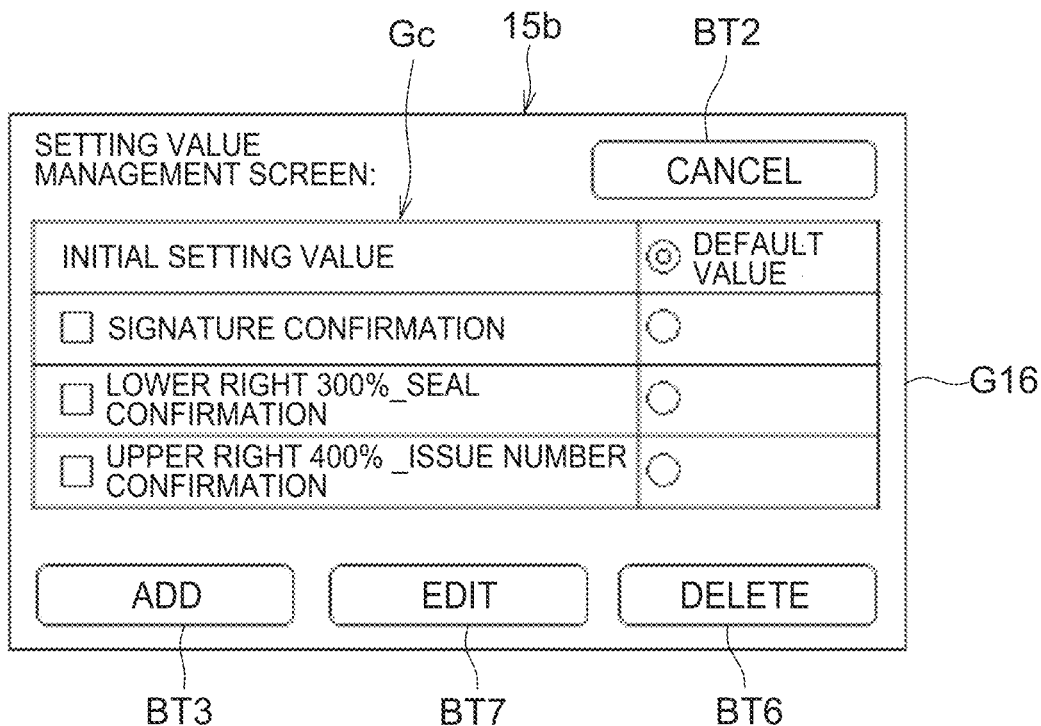
FIG. 23 is a front view illustrating an example of a sixteenth screen displayed on the display.

In the sixteenth screen G16 (setting value management screen) illustrated in FIG. 23, the controller 161 displays, in the registration display field Gc, the setting value registered in the storage 162. In this example, the user selects "Overwrite this file", and the controller 161 displays the "Initial setting value", the "Signature confirmation", the "lower right 300% seal confirmation", and the "Upper right 400% issue number confirmation". If the user touches the "Cancer" button BT2 on the sixteenth screen G16, the display screen returns to the seventeenth screen G17.

Seventeenth Screen

Figure 24:
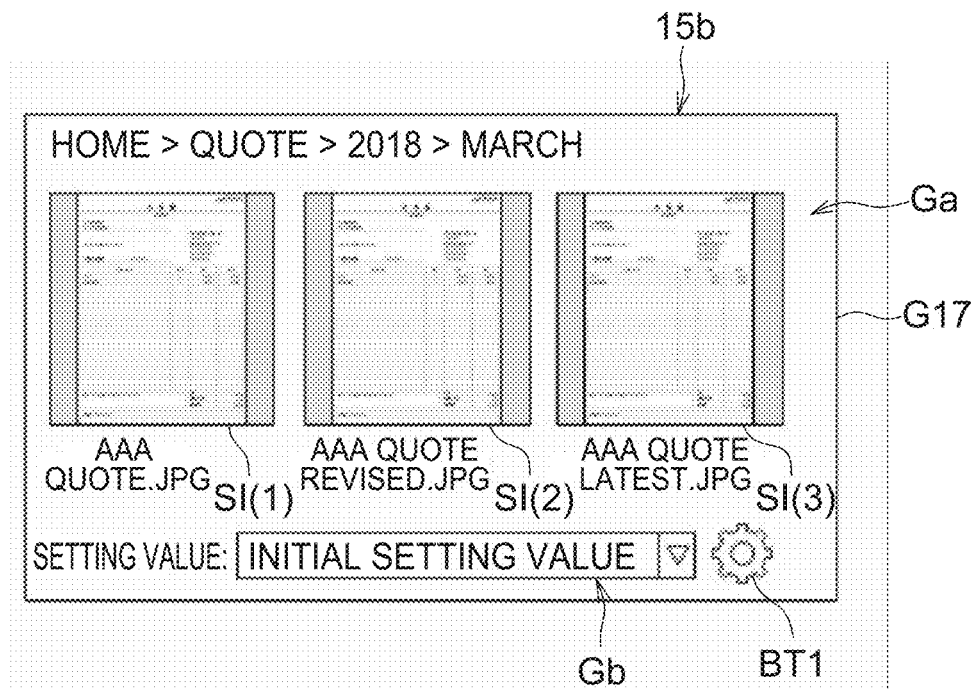
FIG. 24 is a front view illustrating an example of a seventeenth screen displayed on the display.

In the seventeenth screen G17 (thumbnail image display screen) illustrated in FIG. 24, since the current default value is the initial setting value, same as the first screen G1 illustrated in FIG. 8, the thumbnail images SI(1) to SI(3) set based an the initial setting value [reference point Q(1) (upper left), enlargement ratio ER=100%] are displayed in the display field Ga.

Eighteenth Screen

Figure 25:
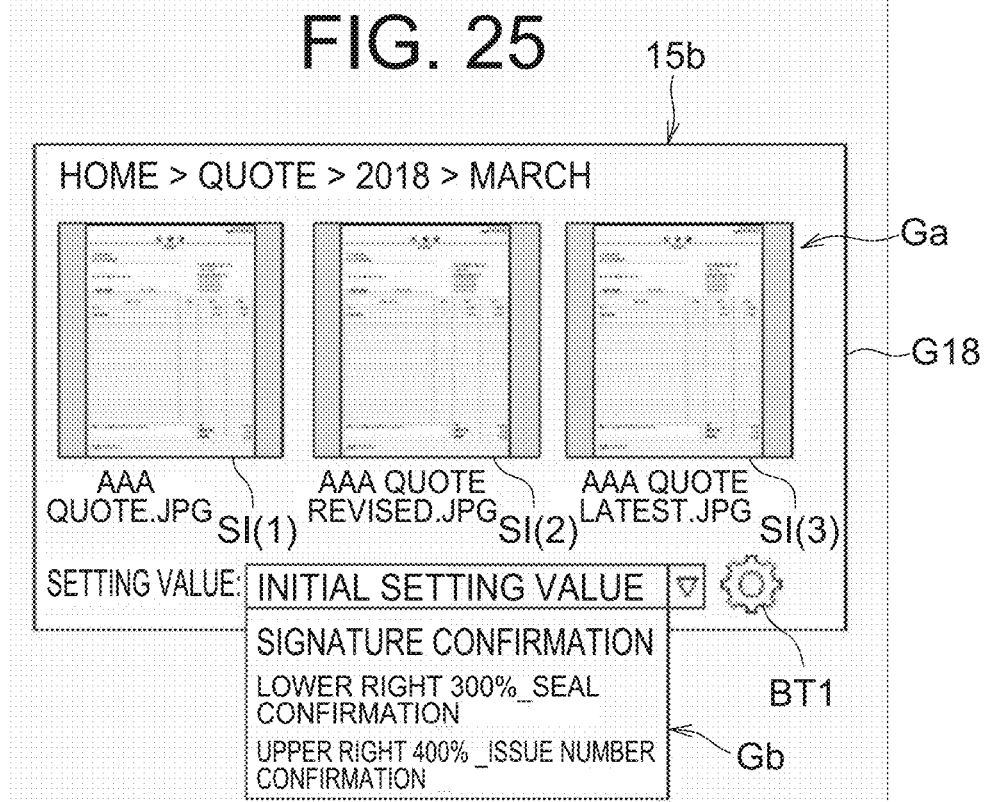
FIG. 25 is a front view illustrating an example of an eighteenth screen displayed on the display.

Then, in the pulldown menu Gb of the setting value, as in the eighteenth screen G18 illustrated in FIG. 25, the "Initial setting value", the "Signature confirmation", the "Lower right 300% seal confirmation" and the "Upper right 400% issue number confirmation" are displayed.

Nineteenth Screen

Figure 26:
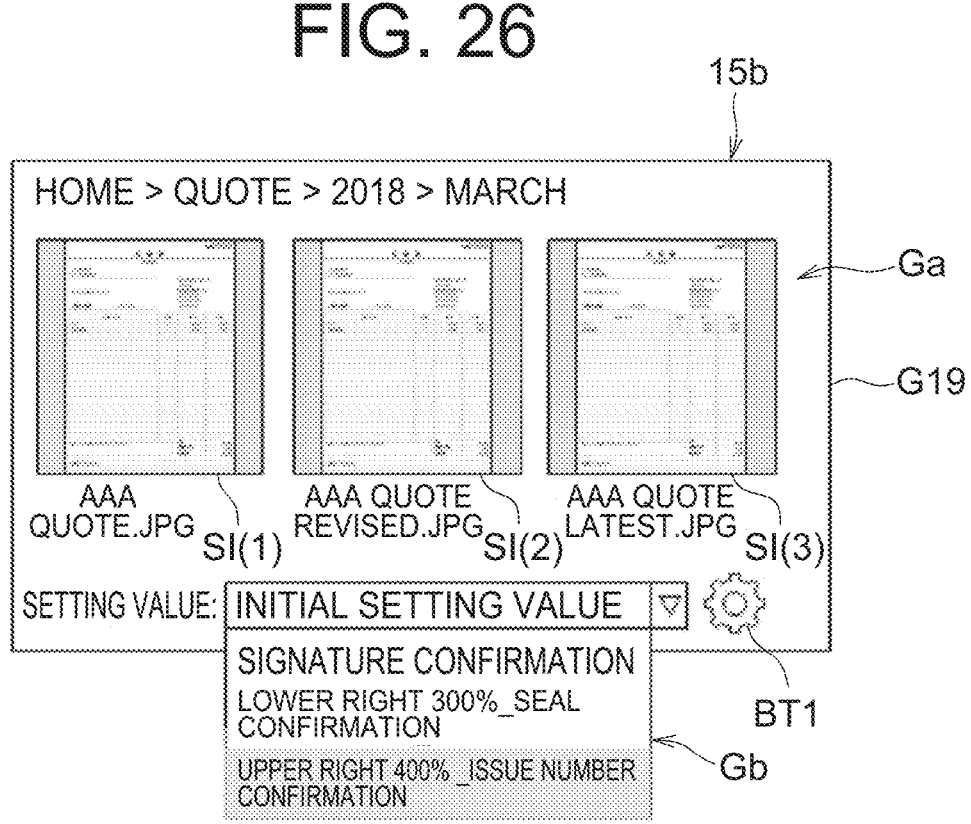
FIG. 26 is a front view illustrating an example of a nineteenth screen displayed on the display.
Figure 27:
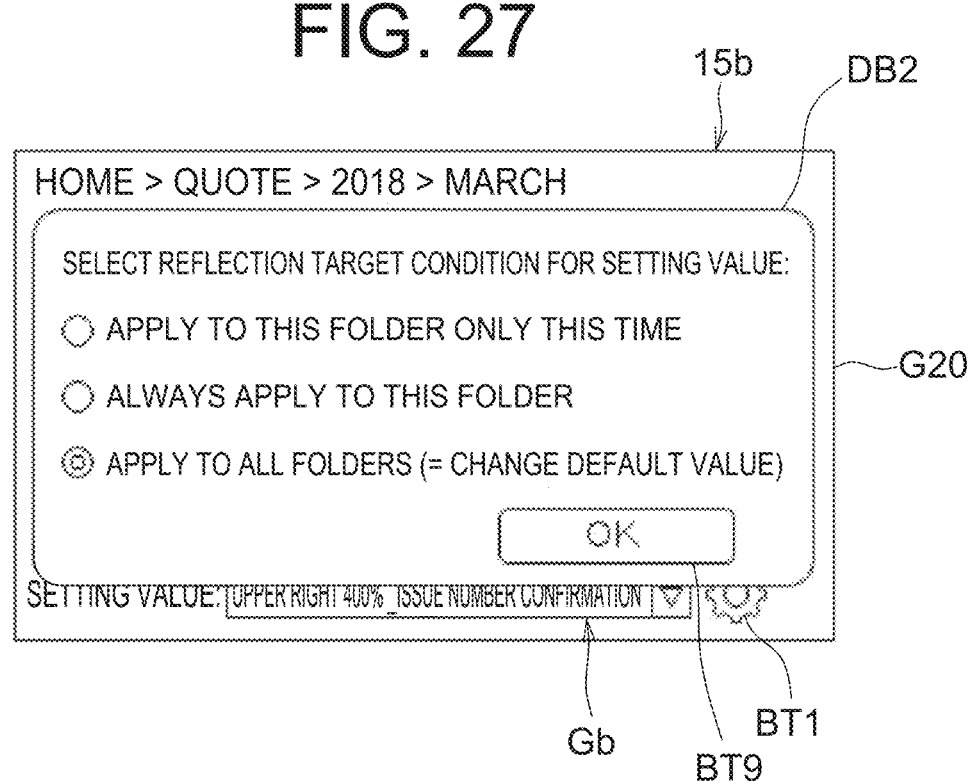
FIG. 27 is a front view illustrating an example of a twentieth screen displayed on the display.

In the pulldown menu Gb of the setting value, as in the nineteenth screen G19 illustrated in FIG. 26, if the user selects any one (for example, the "Upper right 400% issue number confirmation") from menus (the "Signature confirmation", the "lower right 300% seal confirmation", and the "Upper right 400% issue number confirmation") other than the "Initial setting value", the display screen shifts to the twentieth screen G20 (see FIG. 27).

Twentieth Screen

In the twentieth screen G20 illustrated in FIG. 27, the controller 161 displays a dialog box DB2 on the display screen. In the dialog box DB2, the controller 161 receives an operation of selecting "Apply to this folder only this time" (selecting a "Specific folder" only for the setting value), "Always apply to this folder" (always selecting a "Specific folder"), or "Apply to all folders" (=change the default value) (always selecting "All folders"), for a reflection target condition. Here, the "selecting a 'Specific folder'" means that a setting value is applied to the display data DD(1) to DD(i) saved in a folder unit (current folder, in this example, a "March" folder). The "Apply to all folders" means that a setting value is applied to all the display data DD(1) to DD(n) saved in the storage 162.

Figure 28:
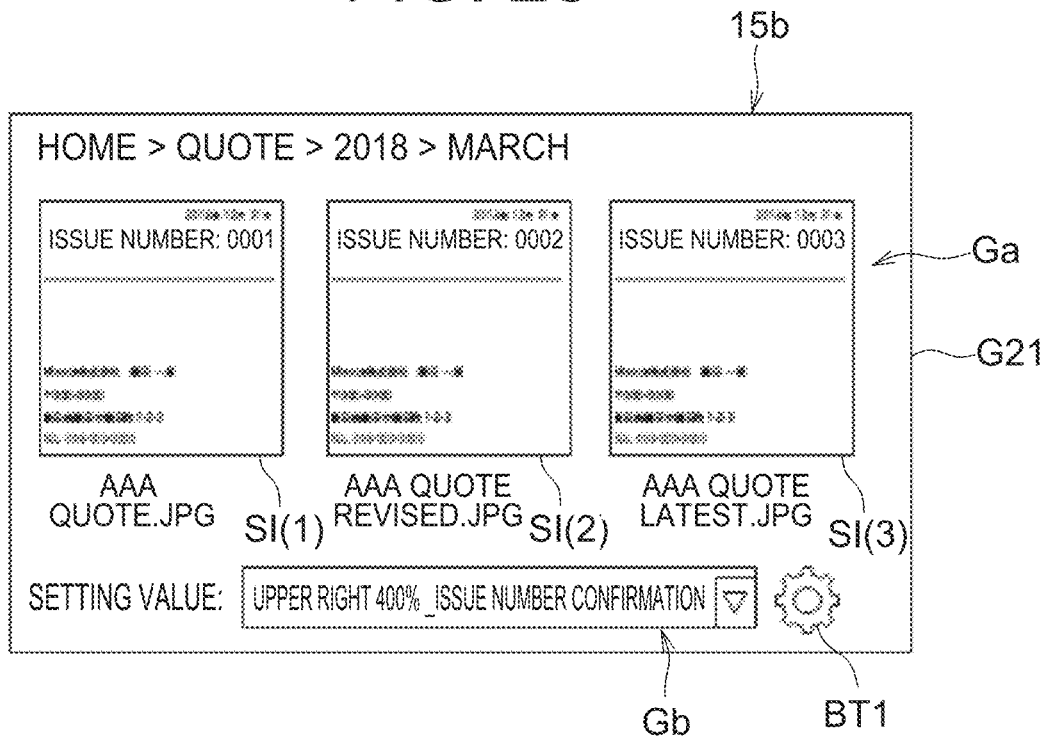
FIG. 28 is a front view illustrating an example of a twenty first screen displayed on the display.
Figure 29:
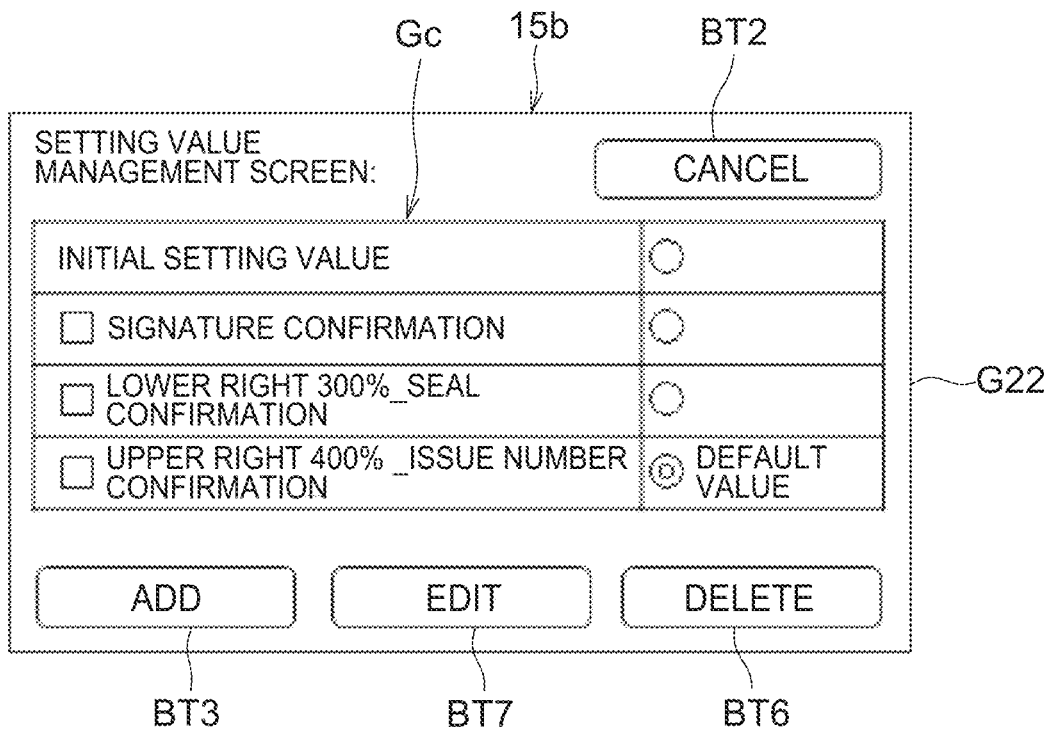
FIG. 29 is a front view illustrating an example of a twenty second screen displayed on the display.

If the user selects any one of the "Apply to this folder only this time", the "Always apply to this folder", and the "Apply to all folders (=change the default value)" and touches an "OK" button BT9, the display screen returns to the twenty first screen G21 (see FIG. 28).

Twenty First Screen

In the twenty first screen G21 (thumbnail image display screen) illustrated in FIG. 28, for example, if the user selects the "Apply to this folder only this time" in the twentieth screen G20 illustrated in FIG. 27, the controller 161 displays the thumbnail images SI(1) to SI(3) corresponding to the display data DD(1) to DD(3) saved in this folder ("March" folder) in the display field Ga of the display 15b, only this time (only at the time of setting), based on the selected setting value (a setting value other than the default value). Furthermore, if the user selects the "Always apply to this folder" in the twentieth screen G20 illustrated in FIG. 27, the controller 161 displays the thumbnail images SI(1) to SI(3) corresponding to the display data DD(1) to DD(3) saved in this folder ("March" folder), in the display field Ga of the display 15b, at all times (always), based on the selected setting value (a setting value other than the default value). In addition, if the user selects the "Apply to all folders (=change the default value)" in the twentieth screen G20 illustrated in FIG. 27, the controller 161 displays the thumbnail images SI(1) to SI(n) corresponding to the display data DD(1) to DD(n) stored in all folders, in the display field Ga of the display 15b, at all times (always), based on the selected setting value (a setting value other than the default value). In this example, the thumbnail images SI(1) to SI(3) set based on the setting value [reference point Q(3) (upper right), enlargement ratio ER=400%] of "Upper right 400% issue number confirmation" is displayed in the display field Ga.

Twenty Second Screen

For example, if the user selects the "Apply to this folder only this time" in the twentieth screen G20 illustrated in FIG. 27, the controller 161 returns the setting value of the "March" folder satisfying the reflection target condition, to the original default value, and maintains the default value for all folders. If the user selects the "Always apply to this folder" in the twentieth screen G20 illustrated in FIG. 27, the controller 161 changes the default value of the "March" folder satisfying the reflection target condition, to the selected setting value, and maintains the default value for another folder. If the user selects the "Apply to all folders (=change the default value)" in the twentieth screen G20 illustrated in FIG. 27, then as in the twenty second screen G22 illustrated in FIG. 29, the controller 161 specifies the default value to the selected setting value (in this example, the setting value of "Upper right 400% issue number confirmation"), and changes the default value of all folders to the selected setting value.

Twenty Third Screen

Figure 30:
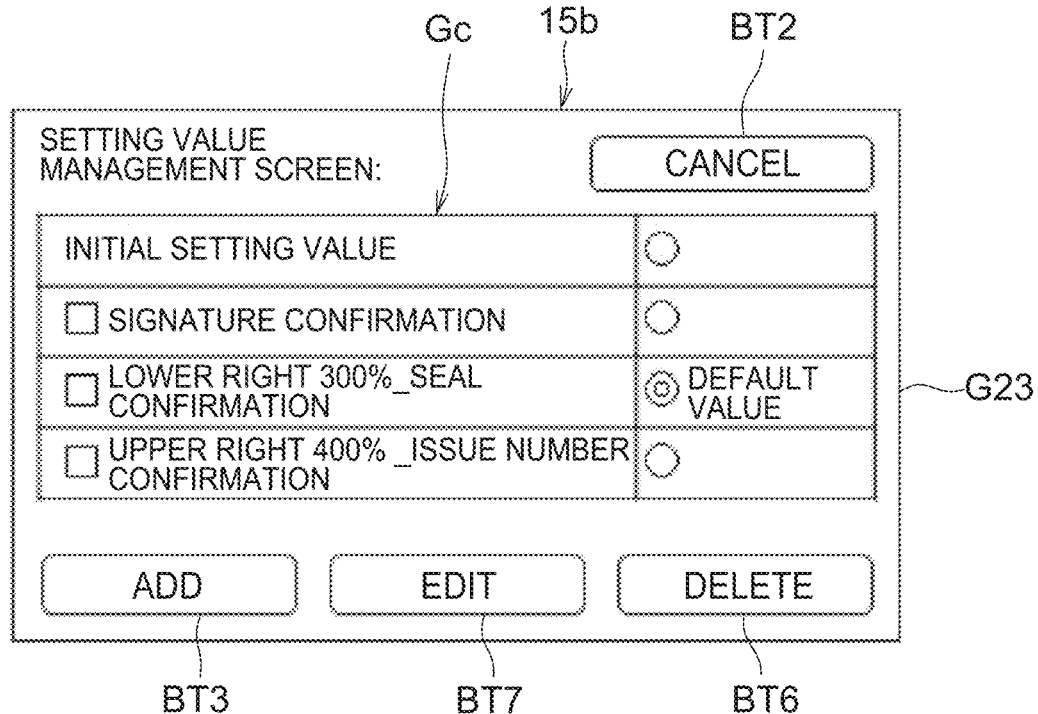
FIG. 30 is a front view illustrating an example of a twenty third screen displayed on the display.

On the other hand, as illustrated in FIG. 30, in the twenty third screen G23 (thumbnail image display screen), if the user selects a setting value other than the default value (in this example, the "Lower right 300% seal confirmation"), the controller 161 specifies the default value to the selected setting value (in this example, the setting value of the "Lower right 300% seal confirmation").

In the example described above, the reference point Q and the enlargement ratio ER are employed as the setting value, however, for example, the rotation angle of the thumbnail image SI, the brightness of the thumbnail image SI, the contrast of the thumbnail image SI, and the like can be employed as another setting value.

Figure 31:
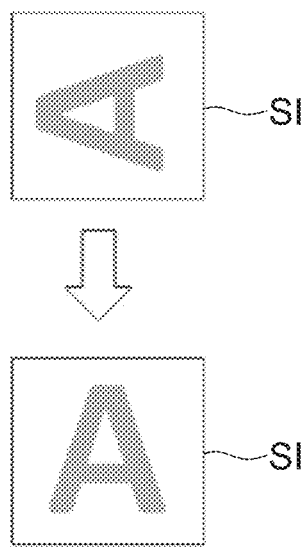
FIG. 31 is an explanatory diagram for describing an example in which a rotation angle of a thumbnail image is employed as a setting value.

FIG. 31 is an explanatory diagram for describing an example in which the rotation angle of the thumbnail image SI is employed as a setting value.

As illustrated in FIG. 31, the thumbnail image SI rotated by 90 degrees counterclockwise can be properly viewed by the user if being rotated by 90 degrees clockwise about the center point of the thumbnail image SI.

As described above, the image processing apparatus 16 can be configured as in the following first embodiment to third embodiment.

First Embodiment

In the first embodiment, the controller 161 functions as a setting value registration processor P3 further including a setting value registration processor P3. That is, the image processing program IP causes the controller 161 to execute steps including the setting value registering step corresponding to the setting value registration processor P3. The setting value registration processor P3 registers the entered setting value into the storage 162. In this way, the registered setting value can be reused. This enables improvement of convenience in the operation of inputting a setting value.

If no setting value is entered at a factory shipment stage, the display switcher P2 cannot switch the target thumbnail image SI to the set thumbnail image SI. In this regard, in the first embodiment, an initial setting value for the position and/or magnification of the thumbnail image SI at the factory shipment stage is registered in advance in the storage 162. The input operation receiver P1 can receive at least an operation of inputting the initial setting value. In this way, the initial setting value can be entered for the setting value at the factory shipment stage, and thus, it is possible to switch the thumbnail image SI to the thumbnail image set based on the initial setting value by the display switcher P2.

When registering a setting value into the storage 162, if a setting value registered in the storage 162 is selected, the user does not know the type of setting of the registered setting value. In this regard, in the first embodiment, the input operation receiver P1 receives an input operation of entering a setting name SN for the setting value. The setting value registration processor P3 registers the setting name SN entered in the input operation into the storage 162. In this way, the user can confirm the registered setting name SN when selecting the setting value registered in the storage 162. As a result, the user can recognize the type of setting of the registered setting value.

In the first embodiment, the input operation receiver P1 receives an input operation of deleting a setting value, and the setting value registration processor P3 deletes, from the storage 162, the setting value to be deleted entered in the input operation. In this way, an unnecessary setting value from among setting values registered in the storage 162 can be eliminated from the storage 162.

In the first embodiment, the input operation receiver P1 receives a first input operation of editing a setting value already registered in the storage 162, and receives a second input operation of selecting "Overwrite" the setting value already registered in the storage 162, or "Register" newly a setting value into the storage 162. If the selection operation entered in the second input operation is a selection operation of selecting "Overwrite", the setting value registration processor P3 overwrites the setting value already registered in the storage 162 with the setting value edited in the first input operation. On the other hand, if the selection operation entered in the second input operation is a selection operation of selecting "Register", the setting value registration processor P3 newly registers the setting value edited in the first input operation into the storage 162.

In this way, the setting value already registered in the storage 162 can be used to edit the setting value. In addition, the user can select whether to replace the already registered setting value with the edited setting value, or to newly register the edited setting value.

Second Embodiment

It is supposed that, typically, a certain setting value is frequently used from among various setting values. In this regard, the second embodiment further includes the default value specification processor P4 that specifies any one of setting values registered in the storage 162 as the current default value. The display switcher P2 displays, on the display 15b, the set thumbnail image based on the default value specified by the default value specification processor P4. In this way, it is possible to specify a certain setting value that would be frequently used among various setting values as the current default value. This enables improvement of convenience in the operation of inputting a setting value.

Third Embodiment

It is conceivable to reflect the current default value onto all the display data DD(1) to DD(n) respectively corresponding to the plurality of thumbnail images SI(1) to SI(n), but some users may desire to reflect the setting value (the setting value other than the default value) entered by the users onto specific display data DD(1) to DD(i) out of the plurality of display data DD(1) to DD(n).

In this regard, in the third embodiment, a plurality of reflection target conditions for the setting values other than the default values for the plurality of display data DD(1) to DD(n) respectively corresponding to the plurality of thumbnail images SI(1) to SI(n) are registered in advance in the storage 162. The input operation receiver P1 receives an input operation of selecting any one of the plurality of reflection target conditions. The display switcher P2 displays, on the display 15b, the thumbnail images SI(1) to SI(i) corresponding to the display data DD(1) to DD(i) satisfying the reflection target condition selected in the input operation, based on the entered setting value (the setting value other than the default value).

In this way, the setting values entered by the user (the setting values other than the default values) can be reflected onto the display data DD(1) to DD(i) satisfying the reflection target condition, out of the plurality of display data DD(1) to DD(n).

In the third embodiment, the storage 162 is provided with a plurality of folders (Home>Quote>2018>March) for saving the display data DD(i) to DD(n). The input operation receiver P1 receives an input operation of selecting whether or not "Specific folder" is a reflection target condition. If the selection operation entered in the input operation is an operation of selecting the "Specific folder", the display switcher P2 displays, on the display 15b, the thumbnail images SI(1) to SI(i) corresponding to the display data DD(1) to DD(i) saved in a specific folder ("March" folder) among the plurality of folders ("Home">"Quote"> "2018">"March"), based on the entered setting value.

In this way, the setting value entered by the user can be reflected onto the display data DD(1) to DD(i) saved in the "Specific folder" out of the plurality of display data DD(1) to DD(n).

In the third embodiment, the input operation receiver P1 receives an input operation of selecting whether or not "All folders" is a reflection target condition. If the selection operation entered in the input operation is a selection operation of selecting the "All folders", the display switcher P2 changes the current default value to the entered setting value.

In this way, the setting value entered by the user can be reflected onto the display data DD(1) to DD(n) saved in all folders (a root folder at the top of the hierarchical structure and all folders at a lower level) out of the plurality of display data DD(1) to DD(n). As a result, the thumbnail images SI(1) to SI(n) corresponding to the display data DD(1) to DD(n) saved in all folders among the plurality of folders can be displayed on the display 15b, based on the entered setting values. Moreover, after this setting, the current default value can be set as the entered setting value. Here, an example of another reflection target condition includes a reflection target condition that display data DD has a specific extension in the file name thereof.

While it is conceivable to reflect the setting value entered by the user (the setting value other than the default value) at all times, some users may desire to reflect the setting value entered by the user (the setting value other than the default value) only for a specific period.

In this regard, in the third embodiment, a plurality of reflection time conditions ("Only at the time of setting", "Always") for the plurality of display data DD(1) to DD(n) respectively corresponding to the plurality of thumbnail images SI(1) to SI(n) are registered in advance in the storage 162. The input operation receiver P1 receives an input operation of selecting any one of the plurality of reflection time conditions. The display switcher P2 displays, on the display 15b the thumbnail images SI(i) to SI(i) according to the reflection time condition selected in the input operation, based on the entered setting value (the setting value other than the default value). In this way, the entered setting value (the setting value other than the default value) can be reflected according to the selected reflection time condition.

In the third embodiment, the input operation receiver P1 receives an input operation of selecting the "Only at the time of setting" or the "Always" for the reflection time condition. If the selection operation entered in the input operation is a selection operation of selecting the "Only at the time of setting", the display switcher P2 displays, on the display 15b, the thumbnail images SI(1) to SI(i) based on the entered setting value only at the time of setting. If the selection operation entered in the input operation is a selection operation of selecting the "Always", the display switcher P2 always displays, on the display 15b, the thumbnail images SI(1) to SI(i) based on the entered setting value. In this way, the user can select whether to reflect the entered setting value only at the time of setting, or always.

If a setting value can be registered into the storage 162 by anyone, the setting value will not be stable, making it difficult for users to use the setting value. In this regard, in the third embodiment, the setting value registration processor P3 limits a user that may register a setting value into the storage 162. In this way, it is possible to stabilize a setting value, thereby making it easy for users to use the setting value. In this case, for example, a user enters an ID and a password at the time of login to be authenticated, only if the user is a specific user (administrator), an operation on the "Administrator mark" button BT1 may be allowed (for example, the "Administrator mark" button BT1 may not be displayed, or may be displayed but may not be operated by users other than the specific user). Alternatively, user authentication may be performed by entering the ID and password when the "Administrator mark" button BT1 is operated.

If similar thumbnail images SI(l) to SI(i) of documents such as quotes are arranged, it is difficult to discriminate a difference between these thumbnail images SI(1) to SI(i). In this regard, in the present embodiment, the image processing apparatus 16 displays the plurality of thumbnail images SI(1) to SI(i) on the display 15b at a predetermined reference magnification (100%) at the time of initial setting.

The setting value includes a predetermined reference point of the plurality of thumbnail images SI(1) to SI(i) and a predetermined enlargement ratio larger than the reference magnification (100%). The input operation receiver P1 receives an input operation of entering a reference point and an enlargement ratio. The display switcher P2, while fixing the entered reference points, enlarges the set thumbnail images SI(1) to SI(i) at the entered enlargement ratio, with the display size of the thumbnail images SI(1) to SI(i) maintained. In this way, it is possible to easily discriminate a difference between the set thumbnail images SI(1) to SI(i).

For example, if the display data DD is entered from an external storage device, or if a document is read by a document conveyor 11a (document feeder), the thumbnail image SI of the entered display data DD, or the thumbnail image SI of the read document may be difficult to see the image SI because of being rotated by 90 degrees or by 180 degrees. In this regard, in the third embodiment, the setting value includes the rotation angle of the plurality of thumbnail images SI(1) to SI(i). The input operation receiver P1 receives an input operation of entering a rotation angle. The display switcher P2 rotates the set thumbnail images SI(1) to SI(i) by the entered rotation angle. In this way, the thumbnail image SI of the entered display data DD or the thumbnail image SI of the read document can be made into a normal legible image.

In the present embodiment, the input operation receiver P1 displays a preview of the switched thumbnail images SI(1) to SI(i) on the screen for setting a setting value (in the display example field Ge of the setting value registration screen). In this way, the user can immediately view the switched thumbnail images SI(1) to SI(i) on the screen for setting a setting value (in the display example field Ge of the setting value registration screen).

OTHER EMBODIMENTS

In the present embodiment, the image processing apparatus 16 is applied to the image forming apparatus 10, but may be applied to a mobile terminal device such as a multi-function communication mobile terminal device (for example, a smartphone). In this case, the image processing program IP is a program used in a mobile terminal device or the like, and is a so-called application that is either installed in advance, or is downloaded from a program server (not illustrated) via communication means such as the Internet, and then installed.

It is noted that examples of a factor for improving the visibility of the thumbnail images SI(1) to SI(i) include color and/or density of the thumbnail images SI(1) to SI(i), in addition to the position and magnification thereof.

The present invention is not limited to the embodiments described above, and can be implemented in various other forms. Therefore, the embodiments are merely an example in all respects and should not be interpreted in a limiting manner. The scope of the present invention is indicated by the claims, and is not restricted by the description of the specification in anyway. Further, all modifications and changes belonging to a scope equivalent to the claims are included within the scope of the present invention.

DESCRIPTION OF REFERENCE NUMERALS

10 Image forming apparatus
11 Image reader
11a Document conveyor
11b Document reader
15 Operation display
15b Display
15d Information inputter/outputter
16 Image processing apparatus
161 Controller
162 Storage
DB1 Dialog box
DB2 Dialog box
DD Display data
ER Enlargement ratio
Ga Display field
Gb Pulldown menu
Gc Registration display field
Gd Setting field
Ge Display example field
IM Display image
IP Image processing program
M USB memory
P1 Input operation receiver
P2 Display switcher
P3 Setting value registration processor
P4 Default value specification processor
Q Reference point
SI Thumbnail image
SN Setting name

What is claimed is:

1. An image processing apparatus for displaying, on a display, a plurality of thumbnail images respectively corresponding to a plurality of display data, comprising:
an input operation receiver that receives an input operation of entering a setting value for at least one of a position and a magnification of the plurality of thumbnails images;
a display switcher that switches a display of a target thumbnail image out of the plurality of display data to a display of a thumbnail image set based on the entered setting value;
a setting value registration processor that registers the entered setting value into a storage; and
a default value specification processor that specifies any one of the each setting value registered in the storage as a current default value, wherein
the display switcher displays, on the display, the thumbnail image set based on the specified default value,
the input operation receiver receives an input operation of selecting any one of a plurality of reflection target conditions,
the display switcher displays, on the display, the plurality of thumbnail images corresponding to the plurality of display data satisfying the selected reflection target condition, based on the setting value,
the input operation receiver receives an input operation of selecting any one of a plurality of reflection time conditions, and
the display switcher displays, on the display, the plurality of thumbnail images based on the setting value, according to the selected reflection time condition.

2. The image processing apparatus according to claim 1, wherein
an initial setting value for at least one of the position and the magnification in a factory shipment state is registered in the storage in advance, and
the input operation receiver is configured to receive at least the input operation for the initial setting value.

3. The image processing apparatus according to claim 1, wherein
the input operation receiver receives an input operation of entering a setting name of the setting value, and
the setting value registration processor registers the entered setting name into the storage.

4. The image processing apparatus according to claim 1, wherein
the input operation receiver receives an input operation of deleting the setting value, and
the setting value registration processor deletes, from the storage, the setting value to be deleted.

5. The image processing apparatus according to claim 1, the input operation receiver receives an input operation of editing the setting value already registered in the storage, and receives an input operation of selecting whether to overwrite the setting value already registered in the storage, or to newly register the edited setting value into the storage, and
if the overwriting is selected, the setting value registration processor overwrites the setting value already registered in the storage with the edited setting value, and if the newly registering is selected, the setting value registration processor newly registers the edited setting value into the storage.

6. The image processing apparatus according to claim 1, wherein
the storage is provided with a plurality of folders for saving the plurality of display data,
the input operation receiver receives an input operation of selecting whether or not a specific folder is the reflection target condition, and
if the specific folder being the reflection target condition is selected, the display switcher displays, on the display, the plurality of thumbnail images corresponding to the plurality of display data saved in a specific folder out of the plurality of folders, based on the setting value.

7. The image processing apparatus according to claim 1, wherein
the storage is provided with a plurality of folders for saving the plurality of display data,
the input operation receiver receives an input operation of selecting whether or not all folders is the reflection target condition, and
if the all folders being the reflection target condition is selected, the display switcher changes the current default value to the setting value.

8. The image processing apparatus according to claim 1, wherein
the input operation receiver receives an input operation of selecting only at the time of setting or always for the reflection time condition, and
if the only at the time of setting is selected, the display switcher displays, on the display, the plurality of thumbnail images based on the setting value only at the time of setting, and if the always is selected, the display switcher always displays, on the display, the plurality of thumbnail images based on the setting value.

9. An image processing method for displaying, on a display, a plurality of thumbnail images respectively corresponding to a plurality of display data, comprising:
receiving an input operation of entering a setting value for at least one of a position and a magnification of the plurality of thumbnails images;
switching a display of a target thumbnail image out of the plurality of display data to a display of a thumbnail image set based on the entered setting value;
registering the entered setting value into a storage;
specifying any one of the each setting value registered in the storage as a current default value;
displaying, on the display, the thumbnail image set based on the specified default value;
receiving an input operation of selecting any one of a plurality of reflection target conditions;
displaying, on the display, the plurality of thumbnail images corresponding to the plurality of display data satisfying the selected reflection target condition, based on the setting value;
receiving an input operation of selecting any one of a plurality of reflection time conditions; and
displaying, on the display, the plurality of thumbnail images based on the setting value, according to the selected reflection time condition.

10. The method according to claim 9, further comprising:
receiving at least an input operation for an initial setting value, wherein the initial setting value for at least one of the position and the magnification in a factory shipment state is registered in the storage in advance.

11. The method according to claim 9, further comprising:
receiving an input operation of entering a setting name of the setting value; and
registering the entered setting name into the storage.

12. The method according to claim 9, further comprising:
receiving an input operation of deleting the setting value; and deleting, from the storage, the setting value to be deleted.

13. The method according to claim 9, further comprising:
receiving an input operation of editing the setting value already registered in the storage, and receiving an input operation of selecting whether to overwrite the setting value already registered in the storage, or to newly registering the edited setting value into the storage, wherein if the overwriting is selected, the setting value already registered in the storage is overwritten with the edited setting value, and if the newly registering is selected, the edited setting value is newly registered into the storage.

14. The method according to claim 9, wherein the storage is provided with a plurality of folders for saving the plurality of display data, and the method, further comprises:

receiving an input operation of selecting whether or not a specific folder is the reflection target condition, wherein if the specific folder being the reflection target condition is selected, the plurality of thumbnail images corresponding to the plurality of display data saved in a specific folder out of the plurality of folders, based on the setting value is displayed on the display.

15. The method according to claim 9, wherein the storage is provided with a plurality of folders for saving the plurality of display data, and the method further comprises:

receiving an input operation of selecting whether or not all folders is the reflection target condition, wherein if the all folders being the reflection target condition is selected, the current default value is changed to the setting value.

16. The method according to claim 9, further comprising:
receiving an input operation of selecting only at the time of setting or always for the reflection time condition, wherein if the only at the time of setting is selected, the display switcher displays, on the display, the plurality of thumbnail images based on the setting value only at the time of setting is displayed on the display, and if the always is selected, the plurality of thumbnail images based on the setting value is displayed on the display.

* * * * *